(12) United States Patent
Pain et al.

(10) Patent No.: US 12,227,862 B2
(45) Date of Patent: Feb. 18, 2025

(54) METHODS FOR ELECTROCHEMICAL ADDITIVE MANUFACTURING OF PARTS

(71) Applicant: FABRIC8LABS, INC., San Diego, CA (US)

(72) Inventors: David Pain, Carlsbad, CA (US); Ian Winfield, Oceanside, CA (US); Andrew Edmonds, Oceanside, CA (US); Kareem Shaik, San Diego, CA (US); Jeffrey Herman, Solana Beach, CA (US); Michael Matthews, Encinitas, CA (US); Charles Pateros, Carlsbad, CA (US)

(73) Assignee: FABRIC8LABS, INC., San Diego, CA (US)

( * ) Notice: Subject to any disclaimer, the term of this patent is extended or adjusted under 35 U.S.C. 154(b) by 0 days.

(21) Appl. No.: 18/583,656

(22) Filed: Feb. 21, 2024

(65) Prior Publication Data
US 2024/0271304 A1    Aug. 15, 2024

Related U.S. Application Data

(63) Continuation of application No. 17/903,966, filed on Sep. 6, 2022, now Pat. No. 11,920,251.
(Continued)

(51) Int. Cl.
*C25D 1/00*    (2006.01)
*B33Y 10/00*    (2015.01)
(Continued)

(52) U.S. Cl.
CPC .............. *C25D 1/003* (2013.01); *C25D 5/10* (2013.01); *C25D 5/60* (2020.08); *C25D 17/12* (2013.01);
(Continued)

(58) Field of Classification Search
None
See application file for complete search history.

(56) References Cited

U.S. PATENT DOCUMENTS 4,575,330 A    3/1986   Hull
4,678,282 A    7/1987   Yaniv et al.
(Continued)

FOREIGN PATENT DOCUMENTS

CN    104178782    12/2014
CN    204097583    1/2015
(Continued)

OTHER PUBLICATIONS

Frey et al., "Switch-matrix-based High-Density Microelectrode Array in CMOS Technology", IEEE Journal of Solid-State-Circuits, Feb. 2010, pp. 467-482, vol. 45, No. 2.
(Continued)

*Primary Examiner* — Louis J Rufo
(74) *Attorney, Agent, or Firm* — Kunzler Bean & Adamson

(57) ABSTRACT

An electrochemical additive manufacturing method includes positioning a cathode portion of a build plate and a deposition anode array into an electrolyte solution. The method additionally includes transmitting electrical energy from the power source through one or more deposition anodes, through the electrolyte solution, and to the cathode portion such that material is deposited onto the cathode portion. The build plate includes a thermal feature, the deposited material is thermally coupled with the thermal feature, and the deposited material forms a heat wicking feature.

20 Claims, 22 Drawing Sheets

Related U.S. Application Data

(60) Provisional application No. 63/260,918, filed on Sep. 4, 2021.

(51) Int. Cl.
*B33Y 30/00* (2015.01)
*C25D 5/00* (2006.01)
*C25D 5/10* (2006.01)
*C25D 17/12* (2006.01)
*C25D 21/12* (2006.01)

(52) U.S. Cl.
CPC .............. *C25D 21/12* (2013.01); *B33Y 10/00* (2014.12); *B33Y 30/00* (2014.12)

(56) References Cited

U.S. PATENT DOCUMENTS

| | | | |
|---|---|---|---|
| 5,132,820 | A | 6/1992 | Someya et al. |
| 5,403,460 | A | 4/1995 | Sala et al. |
| 5,641,391 | A | 6/1997 | Hunter et al. |
| 5,998,805 | A | 12/1999 | Shi et al. |
| 6,036,834 | A | 3/2000 | Clerc |
| 7,839,831 | B2 | 11/2010 | Vrcelj et al. |
| 8,168,540 | B1 | 5/2012 | Reid et al. |
| 8,681,077 | B2 | 3/2014 | Kimura |
| 9,777,385 | B2 | 10/2017 | Wirth et al. |
| 10,465,307 | B2 | 11/2019 | Pain et al. |
| 10,724,146 | B1 | 7/2020 | Pain et al. |
| 10,914,000 | B1 | 2/2021 | Pain et al. |
| 10,947,632 | B1 | 3/2021 | Pain et al. |
| 11,232,956 | B2 | 1/2022 | Pain et al. |
| 11,313,035 | B2 | 4/2022 | Pain et al. |
| 11,313,036 | B2 | 4/2022 | Pain et al. |
| 11,401,603 | B2 | 8/2022 | Pain et al. |
| 2001/0014409 | A1 | 8/2001 | Cohen |
| 2003/0006133 | A1 | 1/2003 | Metzger |
| 2004/0129573 | A1 | 7/2004 | Cohen |
| 2004/0134788 | A1* | 7/2004 | Cohen .................... C25D 5/022 205/135 |
| 2005/0045252 | A1 | 3/2005 | Yamasaki et al. |
| 2005/0176238 | A1 | 8/2005 | Cohen et al. |
| 2005/0183959 | A1 | 8/2005 | Wilson et al. |
| 2005/0202660 | A1 | 9/2005 | Cohen et al. |
| 2005/0223543 | A1 | 10/2005 | Cohen et al. |
| 2006/0134831 | A1* | 6/2006 | Cohen ................. H01L 21/4857 257/E23.098 |
| 2006/0283539 | A1 | 12/2006 | Slafer |
| 2007/0068819 | A1 | 3/2007 | Singh et al. |
| 2007/0089993 | A1 | 4/2007 | Schwartz et al. |
| 2007/0221504 | A1 | 9/2007 | Yuefeng |
| 2010/0300886 | A1 | 12/2010 | Lin et al. |
| 2011/0210005 | A1 | 9/2011 | Van Den Bossche et al. |
| 2017/0145584 | A1 | 5/2017 | Wirth et al. |
| 2019/0160594 | A1 | 5/2019 | Flamm et al. |
| 2021/0047744 | A1 | 2/2021 | Biton |
| 2021/0348288 | A1* | 11/2021 | Eliyahu .................. B22F 10/10 |

FOREIGN PATENT DOCUMENTS

| | | |
|---|---|---|
| CN | 104593830 | 5/2015 |
| WO | 2017087884 | 5/2017 |
| WO | 2019150362 | 8/2019 |
| WO | 2021041265 | 3/2021 |

OTHER PUBLICATIONS

Stewart et al., "Polysilicon TFT Technology for Active Matrix OLED Displays", IEEE Transactions on Electron Devices, May 2001, pp. 845-851, vol. 48, No. 5.
International Search Report and Written Opinion for PCT/US2020/047531 dated Sep. 29, 2020.
Supplementary International Search Report for PCT/US2020/047531 dated Nov. 22, 2021.
U.S. Appl. No. 17/554,677, filed Dec. 17, 2021.
U.S. Appl. No. 17/566,546, filed Dec. 30, 2021.
U.S. Appl. No. 17/535,437, filed Nov. 24, 2021.
U.S. Appl. No. 17/738,729, filed May 6, 2022.
U.S. Appl. No. 17/863,272, filed Jul. 12, 2022.
Nakamura et al., Incorporation of input function into displays using LTPS TFT technology, Journal of the SID, 2006, pp. 363-369, 14/4.

* cited by examiner

METHODS FOR ELECTROCHEMICAL ADDITIVE MANUFACTURING OF PARTS

CROSS-REFERENCE TO RELATED APPLICATIONS

This application is a continuation of U.S. patent application Ser. No. 17/903,966, filed Sep. 6, 2022, which claims the benefit of U.S. Provisional Patent Application No. 63/260,918, filed Sep. 4, 2021, both of which are incorporated herein by reference in their entirety.

FIELD

This disclosure relates generally to manufacturing parts, and more particularly to systems and methods for manufacturing parts using electrochemical additive manufacturing techniques.

BACKGROUND

Electrochemical additive manufacturing utilizes electrochemical reactions to manufacture parts in an additive manufacturing manner. In an electrochemical additive manufacturing process, a metal part is constructed by plating charged metal ions onto a surface of a cathode in an electrolyte solution. This technique relies on placing a deposition anode physically close to the cathode in the presence of a deposition solution (the electrolyte), and energizing the anode causing charge to flow through the anode. This creates an electrochemical reduction reaction to occur at the cathode near the anode and deposition of material on the cathode. Although electrochemical additive manufacturing techniques provide distinct advantages over other types of additive manufacturing processes, such as selective laser melting and electron beam melting, cathodes of conventional electrochemical additive manufacturing systems are single-purpose cathodes.

SUMMARY

The subject matter of the present application has been developed in response to the present state of the art, and in particular, in response to the shortcomings of conventional systems and methods for additive manufacturing of parts, that have not yet been fully solved by currently available techniques. Accordingly, the subject matter of the present application has been developed to provide systems and methods for the electrochemical additive manufacturing of parts that overcome at least some of the above-discussed shortcomings of prior art techniques.

The following is a non-exhaustive list of examples, which may or may not be claimed, of the subject matter, disclosed herein.

The following portion of this paragraph delineates example 1 of the subject matter, disclosed herein. According to example 1, an electrochemical additive manufacturing method is disclosed. The method comprises a step of positioning a conductive surface of a cathode portion of a build plate into an electrolyte solution such that the conductive surface directly contacts the electrolyte solution. The method also comprises a step of positioning a deposition anode array into the electrolyte solution such that a gap is defined between the conductive surface of the cathode portion and the deposition anode. The method additionally comprises a step of transmitting electrical energy through the deposition anode. The method further comprises a step of transmitting the electrical energy from the deposition anode, through the electrolyte solution, and to the conductive surface of the cathode portion, such that material is deposited onto the conductive surface of the cathode portion. The build plate and the material deposited onto the conductive surface form at least a portion of a finished product (e.g., component) having a particular functionality. The build plate at least partially enables the particular functionality.

The following portion of this paragraph delineates example 2 of the subject matter, disclosed herein. According to example 2, which encompasses example 1, above, the build plate comprises prefabricated features.

The following portion of this paragraph delineates example 3 of the subject matter, disclosed herein. According to example 3, which encompasses example 2, above, the prefabricated features are formed via a process selected from the group consisting of casting, forging, rolling, cutting, grinding, and drilling.

The following portion of this paragraph delineates example 4 of the subject matter, disclosed herein. According to example 4, which encompasses any one of examples 1-3, above, the build plate comprises a thermal feature configured to transfer heat, and the material deposited onto the conductive surface is thermally coupled with the thermal feature to promote heat transfer by or to the thermal feature.

The following portion of this paragraph delineates example 5 of the subject matter, disclosed herein. According to example 5, which encompasses example 4, above, the material deposited onto the conductive surface forms a heat wicking feature.

The following portion of this paragraph delineates example 6 of the subject matter, disclosed herein. According to example 6, which encompasses any one of examples 1-5, above, the build plate forms at least a portion of a fluid channel.

The following portion of this paragraph delineates example 7 of the subject matter, disclosed herein. According to example 7, which encompasses example 6, above, the material deposited onto the conductive surface forms a wicking feature inside the fluid channel.

The following portion of this paragraph delineates example 8 of the subject matter, disclosed herein. According to example 8, which encompasses any one of examples 1-7, above, the build plate comprises a non-conductive substrate, the cathode portion comprises a conductive layer on a surface of the non-conductive substrate, and the conductive surface is defined by the conductive layer.

The following portion of this paragraph delineates example 9 of the subject matter, disclosed herein. According to example 9, which encompasses example 8, above, the build plate, the cathode portion, and the material deposited onto the conductive surface form an electronic sensor component.

The following portion of this paragraph delineates example 10 of the subject matter, disclosed herein. According to example 10, which encompasses example 9, above, the electronic sensor component comprises at least one of a thermocouple or a strain gauge.

The following portion of this paragraph delineates example 11 of the subject matter, disclosed herein. According to example 11, which encompasses any one of examples 8-10, above, the material deposited onto the conductive surface forms a surface mount technology (SMT) passive component.

The following portion of this paragraph delineates example 12 of the subject matter, disclosed herein. According to example 12, which encompasses any one of examples 8-11, the conductive layer comprises circuit traces, each forming part of the same electrical circuit or a corresponding one of multiple electrical circuits formed on or in the non-conductive substrate.

The following portion of this paragraph delineates example 13 of the subject matter, disclosed herein. According to example 13, which encompasses example 12, above, the conductive layer comprises at least two electrical terminals, spaced apart from each other, and the material deposited onto the conductive surface forms an electrical connection that electrically couples together the at least two electrical terminals.

The following portion of this paragraph delineates example 14 of the subject matter, disclosed herein. According to example 14, which encompasses any one of examples 12 or 13, above, the material deposited onto the conductive surface forms a radio-frequency (RF) component.

The following portion of this paragraph delineates example 15 of the subject matter, disclosed herein. According to example 15, which encompasses any one of examples 12-14, above, the method further comprises selectively connecting the circuit traces to an electrical power source to cause the electrical energy to transmit through the deposition anode array and from the deposition anode array to the circuit traces, such that the material is deposited onto the circuit traces.

The following portion of this paragraph delineates example 16 of the subject matter, disclosed herein. According to example 16, which encompasses any one of examples 1-15, above, the build plate comprises a self-supporting structure, and the material deposited onto the conductive surface of the cathode portion forms a non-self-supporting structure that is supported by the self-supporting structure.

The following portion of this paragraph delineates example 17 of the subject matter, disclosed herein. According to example 17, which encompasses any one of examples 1-16, above, the build plate comprises an electronic component.

The following portion of this paragraph delineates example 18 of the subject matter, disclosed herein. According to example 18, which encompasses any one of examples 1-17, above, the build plate comprises an excess material portion, and the method further comprises a step of removing at least a portion of the excess material portion of the build plate after the material is deposited onto the conductive surface of the cathode portion.

The following portion of this paragraph delineates example 19 of the subject matter, disclosed herein. According to example 19, which encompasses any one of examples 1-18, above, the build plate comprises a pre-used part comprising a worn portion from which worn material has been removed, and the material, deposited onto the conductive surface, replaces the worn material.

The following portion of this paragraph delineates example 20 of the subject matter, disclosed herein. According to example 20, an electrochemical deposition system for fabricating a manufactured part comprises an electrodeposition cell, configured to hold an electrolytic fluid. The system also comprises a build plate, comprising characteristics that contribute to the functionality of the manufactured part. The characteristics comprise a cathode portion having a conductive surface. The system also comprises a printhead, comprising a plurality of deposition anodes positioned within the electrodeposition cell, a mounting system, configured to position the cathode portion of the build plate in the electrodeposition cell, an electrical power supply, configured to create a voltage potential on the cathode portion of the build plate, and a positioning system, configured to control a distance between the cathode portion of the build plate and the plurality of deposition anodes of the printhead. The system further comprises a controller, configured to control a current field across the plurality of deposition anodes, when the electrodeposition cell holds the electrolytic fluid, to selectively deposit material onto the cathode portion of the build plate. The material deposited onto the cathode portion forms a portion of the manufactured part.

The following portion of this paragraph delineates example 21 of the subject matter, disclosed herein. According to example 21, which encompasses example 20, above, the build plate comprises prefabricated features.

The following portion of this paragraph delineates example 22 of the subject matter, disclosed herein. According to example 22, which encompasses example 21, above, the prefabricated features are formed via a process selected from the group consisting of casting, forging, rolling, cutting, grinding, and drilling.

The following portion of this paragraph delineates example 23 of the subject matter, disclosed herein. According to example 23, which encompasses any one of examples 20-22, above, the build plate comprises a thermal feature configured to transfer heat.

The following portion of this paragraph delineates example 24 of the subject matter, disclosed herein. According to example 24, which encompasses any one of examples 20-23, the build plate comprises a self-supporting structure.

The following portion of this paragraph delineates example 25 of the subject matter, disclosed herein. According to example 25, which encompasses any one of examples 20-24, the build plate comprises a non-conductive substrate, the cathode portion comprises a conductive layer on a surface of the non-conductive substrate, and the conductive surface is defined by the conductive layer.

The following portion of this paragraph delineates example 26 of the subject matter, disclosed herein. According to example 26, which encompasses any one of examples 20-25, the build plate comprises an electronic component.

The following portion of this paragraph delineates example 27 of the subject matter, disclosed herein. According to example 27, which encompasses example 26, above, the build plate and the cathode portion form an electronic sensor component.

The following portion of this paragraph delineates example 28 of the subject matter, disclosed herein. According to example 28, which encompasses example 27, above, the electronic sensor component comprises at least one of a thermocouple or a strain gauge.

The following portion of this paragraph delineates example 29 of the subject matter, disclosed herein. According to example 29, which encompasses any one of examples 20-28, above, the build plate comprises a non-conductive substrate, the cathode portion comprises a conductive layer on a surface of the non-conductive substrate, the conductive surface is defined by the conductive layer, and the conductive layer comprises circuit traces, each forming part of the same electrical circuit or a corresponding one of multiple electrical circuits formed on or in the non-conductive substrate.

The following portion of this paragraph delineates example 30 of the subject matter, disclosed herein. According to example 30, which encompasses any one of examples 20-29, above, the build plate comprises an excess material portion configured to be removed after the material is deposited onto the cathode portion.

The following portion of this paragraph delineates example 31 of the subject matter, disclosed herein. According to example 31, which encompasses any one of examples 20-30, above, the build plate comprises a pre-used part comprising a worn portion from which worn material has been removed.

The following portion of this paragraph delineates example 32 of the subject matter, disclosed herein. According to example 32, an electrochemical additive manufacturing method is disclosed. The method comprises a step of positioning a build plate into an electrolyte solution such that a conductive layer of the build plate directly contacts the electrolyte solution. The conductive layer comprises at least one conductive-layer segment forming a pattern corresponding with a component. The method also comprises positioning a deposition anode array, comprising a plurality of deposition anodes, into the electrolyte solution such that a gap is established between the at least one conductive-layer segment and the deposition anode array. The method further comprises connecting the at least one conductive-layer segment to a power source and connecting one or more deposition anodes of the plurality of deposition anodes to the power source. The one or more deposition anodes of the plurality of deposition anodes correspond with at least a portion of the pattern formed by the at least one conductive-layer segment. The method additionally comprises transmitting electrical energy from the power source through the one or more deposition anodes of the plurality of deposition anodes corresponding with the at least the portion of the pattern formed by the at least one conductive-layer segment, through the electrolyte solution, and to the at least one conductive-layer segment, such that material is deposited onto the at least one conductive-layer segment and forms at least a portion of the component.

The following portion of this paragraph delineates example 33 of the subject matter, disclosed herein. According to example 33, which encompasses example 32, above, the one or more deposition anodes of the plurality of deposition anodes, corresponding with the at least the portion of the pattern formed by the at least one conductive-layer segment, form a pattern matching the at least the portion of the pattern formed by the at least one conductive-layer segment.

The following portion of this paragraph delineates example 34 of the subject matter, disclosed herein. According to example 34, which encompasses any one of examples 32 and 33, above, the at least one conductive-layer segment comprises an elongated strip of electrically conductive material.

The following portion of this paragraph delineates example 35 of the subject matter, disclosed herein. According to example 35, which encompasses any one of examples 32-34, above, the conductive layer comprises multiple conductive-layer segments. The multiple conductive-layer segments are electrically isolated from each other via the dielectric layer.

The following portion of this paragraph delineates example 36 of the subject matter, disclosed herein. According to example 36, which encompasses example 35, above, the electrochemical additive manufacturing method further comprises electrically coupling together the multiple conductive-layer segments, and synchronously depositing the material onto the multiple conductive-layer segments.

The following portion of this paragraph delineates example 37 of the subject matter, disclosed herein. According to example 37, which encompasses any one of examples 35 and 36, above, the electrochemical additive manufacturing method further comprises connecting a first one of the multiple conductive-layer segments to the power source independently of a second one of the multiple conductive-layer segments, depositing the material onto the first one of the multiple conductive-layer segments, and depositing the material onto the second one of the multiple conductive-layer segments. The material is deposited onto the first one of the multiple conductive-layer segments asynchronously relative to the deposition of the material onto the second one of the multiple conductive-layer segments.

The following portion of this paragraph delineates example 38 of the subject matter, disclosed herein. According to example 38, which encompasses any one of examples 32-37, above, the conductive layer consists of a patterned foil of electrically conductive material.

The following portion of this paragraph delineates example 39 of the subject matter, disclosed herein. According to example 39, which encompasses any one of examples 32-38, above, the build plate is a printed circuit board comprising a dielectric layer, made of an electrically insulating material, and the at least one conductive-layer segment.

The following portion of this paragraph delineates example 40 of the subject matter, disclosed herein. According to example 40, which encompasses any one of examples 32-39, above, the build plate comprises a substrate, made of one of an electrically non-conductive material or a semiconductor material, and the at least one conductive-layer segment is on the substrate.

The following portion of this paragraph delineates example 41 of the subject matter, disclosed herein. According to example 41, which encompasses any one of examples 32-40, above, the electrochemical additive manufacturing method further comprises transmitting an electrical signal through the material after a quantity of the material is deposited onto the conductive-layer segment, sensing a characteristic of the electrical signal, and depositing an additional quantity of the material onto the quantity of the material in response to a sensed characteristic of the electrical signal.

The following portion of this paragraph delineates example 42 of the subject matter, disclosed herein. According to example 42, which encompasses any one of examples 32-41, above, the electrochemical additive manufacturing method further comprises transmitting an electrical signal through the material after a quantity of the material is deposited onto the conductive-layer segment, sensing a characteristic of the electrical signal, and depositing additional quantities of the material onto the conductive-layer segment until a sensed characteristic of the electrical signal reaches a predetermined threshold.

The following portion of this paragraph delineates example 43 of the subject matter, disclosed herein. According to example 43, which encompasses any one of examples 32-42, above, the component comprises a capacitor, the conductive layer comprises multiple conductive-layer segments, the build plate further comprises a dielectric layer, the multiple conductive-layer segments are electrically isolated from each other, and the material deposited onto the multiple conductive-layer segments forms two opposing plates of the capacitor.

The following portion of this paragraph delineates example 44 of the subject matter, disclosed herein. According to example 44, which encompasses any one of examples 32-43, above, the component comprises a resistor, the conductive layer comprises multiple conductive-layer segments, the build plate further comprises a dielectric layer, the multiple conductive-layer segments are electrically isolated from each other, and the material deposited onto the multiple conductive-layer segments forms two opposing walls of the resistor. The method further comprises depositing an electrically resistive material into a gap defined between the two opposing walls of the resistor.

The following portion of this paragraph delineates example 45 of the subject matter, disclosed herein. According to example 45, which encompasses any one of examples 32-44, above, the component comprises an electronic sensor component, and the at least one conductive-layer segment and the material deposited onto the at least one conductive-layer segment form an electronic sensor component.

The following portion of this paragraph delineates example 46 of the subject matter, disclosed herein. According to example 46, which encompasses example 45, above, the electronic sensor component comprises at least one of a thermocouple or a strain gauge.

The following portion of this paragraph delineates example 47 of the subject matter, disclosed herein. According to example 47, which encompasses any one of examples 32-46, above, the component comprises a surface mount technology (SMT) passive component, and the material deposited onto the at least one conductive-layer segment forms the SMT passive component.

The following portion of this paragraph delineates example 48 of the subject matter, disclosed herein. According to example 48, which encompasses any one of examples 32-47, above, the conductive layer comprises multiple conductive-layer segments, the build plate further comprises a dielectric layer, the multiple conductive-layer segments are electrically isolated from each other, and the material deposited onto the multiple conductive-layer segments forms an electrical connection that electrically couples together the multiple conductive-layer segments.

The following portion of this paragraph delineates example 49 of the subject matter, disclosed herein. According to example 49, which encompasses any one of examples 32-48, above, the component comprises a radio-frequency (RF) component, and the material deposited onto the at least one conductive-layer segment forms the RF component.

The following portion of this paragraph delineates example 50 of the subject matter, disclosed herein. According to example 50, an electrochemical deposition system for fabricating a manufactured part comprises an electrodeposition cell, configured to hold an electrolytic fluid. The system also comprises a build plate, comprising a conductive layer that comprises at least one conductive-layer segment forming a pattern corresponding with a component. The system further comprises a deposition anode array, comprising a plurality of deposition anodes, and a mounting system, configured to position the at least one conductive-layer segment and the plurality of deposition anodes in direct contact with the electrolytic fluid, such that a gap is established between the at least one conductive-layer segment and the plurality of deposition anodes, when the electrolytic fluid is held in the electrodeposition cell. The system additionally comprises a power source, configured to create a voltage potential on the at least one conductive-layer segment, and a positioning system, configured to control a distance between the at least one conductive-layer segment and the plurality of deposition anodes. The system also comprises a controller, configured to control a current field across deposition anodes of the plurality of deposition anodes corresponding with at least a portion of the pattern formed by the at least one conductive-layer segment, when the electrodeposition cell holds the electrolytic fluid and the at least one conductive-layer segment and the plurality of anodes are positioned in direct contact with the electrolytic fluid, to selectively deposit material onto the at least one conductive-layer segment to form at least a portion of the component.

The following portion of this paragraph delineates example 51 of the subject matter, disclosed herein. According to example 51, which encompasses example 50, above, the build plate is a printed circuit board comprising a dielectric layer, made of an electrically insulating material, and the at least one conductive-layer segment.

The following portion of this paragraph delineates example 52 of the subject matter, disclosed herein. According to example 52, which encompasses any one of examples 50 or 51, above, the build plate comprises a substrate made of one of an electrically non-conductive material or a semiconductor material. The at least one conductive-layer segment is on the substrate.

The following portion of this paragraph delineates example 53 of the subject matter, disclosed herein. According to example 53, which encompasses any one of examples 50-52, above, the deposition anodes of the plurality of deposition anodes, corresponding with the at least the portion of the pattern formed by the at least one conductive-layer segment, form a pattern matching at least the portion of the pattern formed by the at least one conductive-layer segment.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are examples of an electrochemical additive manufacturing process for constructing a metal part or a metallic portion of a part by reducing charged metal ions onto a surface in an electrolyte solution. Electrochemical additive manufacturing, otherwise known as electrochemical deposition manufacturing, includes placement of a printhead, including at least one deposition anode, physically close to a cathode in the presence of a deposition solution (e.g., an electrolyte), and energizing the deposition anode, which causes an electrical charge to flow through the deposition anode. The flow of the electrical charge through the deposition anode creates an electrochemical reduction reaction to occur at the cathode, near the deposition anode, which results in the deposition of material on the cathode.

The cathode of the electrochemical additive manufacturing method and system disclosed herein is a cathode portion of a multi-purpose build plate. In other words, rather than only providing the single function of a surface of a system onto which a part is formed, the multi-purpose build plate of the present disclosure also provides additional functionality. According to some examples of the present disclosure, the build plate, and the material deposited on the cathode portion of the build plate, form at least a portion of a finished product, the cathode portion of the build plate includes a patterned conductive surface, and/or the build plate, including the cathode portion, is used as a tool to apply the deposited material onto a separate part. In this manner, the build plate, which is necessary to induce deposition of material from the electrolyte solution during an electrochemical additive manufacturing process, instead of being a single-use component, is a multi-use component that is further utilized as part of a manufactured product or a tool that facilitates manufacture of a manufactured product.

Figure 1:
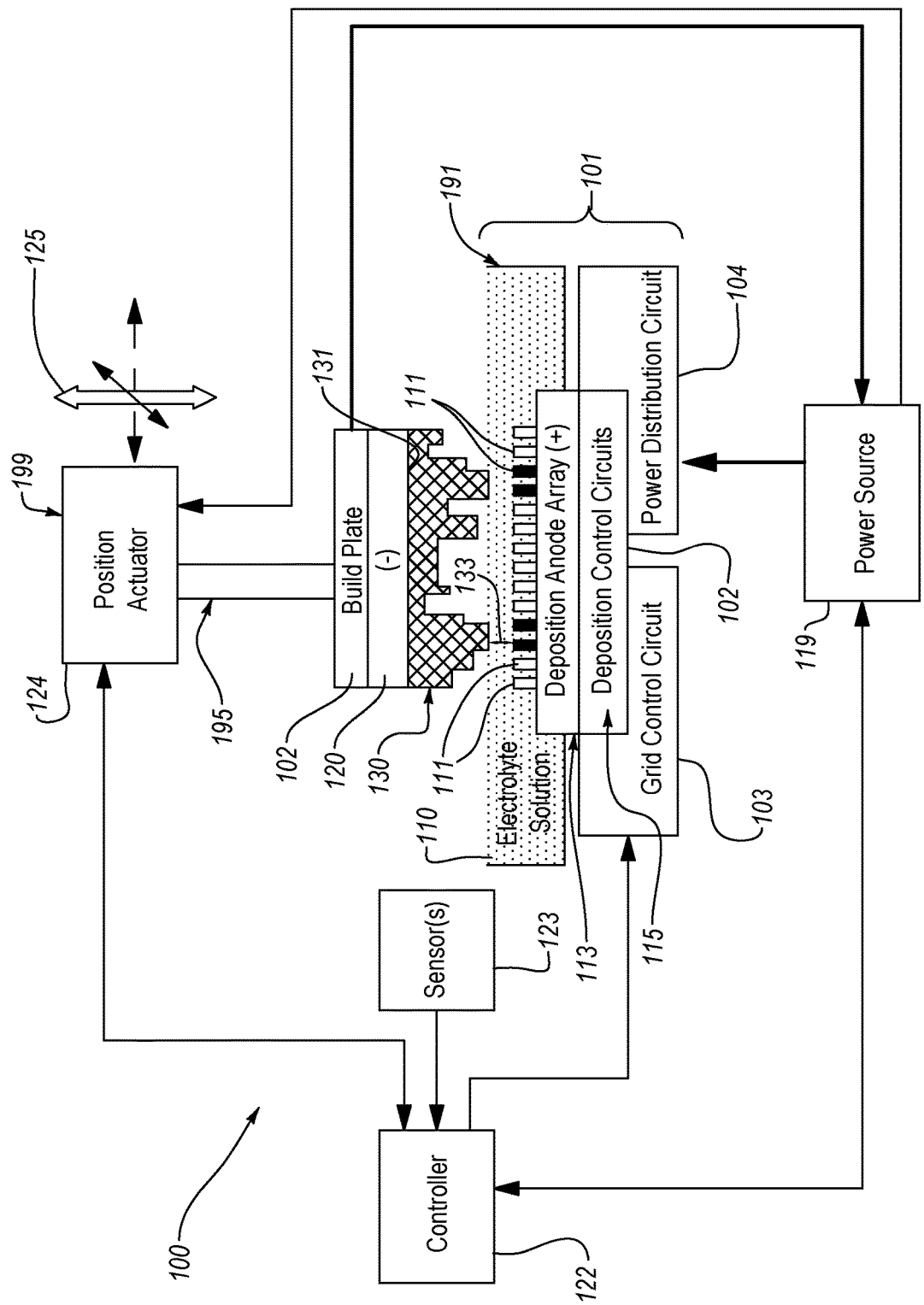
FIG. 1 is a schematic, side elevation view of an electrochemical deposition system for manufacturing a part, according to one or more examples of the present disclosure.

Referring to FIG. 1, according to some examples, an electrochemical deposition system 100 includes a printhead 101 that contains at least one deposition anode 111. In certain examples, the printhead 101 contains a plurality of deposition anodes 111 arranged into a deposition anode array 113. The printhead 101 further includes at least one deposition control circuit corresponding with the deposition anode 111. In examples where the printhead 101 contains the deposition anode array 113, the printhead 101 includes a plurality of deposition control circuits 115 where at least one of the deposition control circuits 115 corresponds with each one of the deposition anodes 111 of the deposition anode array 113. The deposition control circuits 115 are organized into a matrix arrangement, in some examples, thereby supporting a high resolution of deposition anodes 111. The deposition anodes 111 of the deposition anode array 113 are arranged to form a two-dimensional grid in some examples. In FIG. 1, one dimension of the grid is shown with the other dimension of the grid going into and/or coming out of the page.

The printhead 101 further includes a grid control circuit 103 that transmits control signals to the deposition control circuits 115 to control the amount of electrical current flowing through each one of the deposition anodes 111 of the deposition anode array 113. The printhead 101 additionally includes a power distribution circuit 104. The electrical current, supplied to the deposition anodes 111 via control of the grid control circuit 103, is provided by the power distribution circuit 104, which routes power from an electrical power source 119 (see, e.g., FIG. 12) of the electrochemical deposition system 100 to the deposition control circuits 115 and then to the deposition anodes 111. Although not shown, in some examples, the printhead 101 also includes features, such as insulation layers, that help protect other features of the printhead 101 from an electrolyte solution 110, as described in more detail below.

The electrochemical deposition system 100 further includes a build plate 102 and the electrolyte solution 110, which can be contained within a partially enclosed container 191. In some examples, the electrolyte solution 110 includes one or more of, but not limited to, plating baths, associated with copper, nickel, tin, silver, gold, lead, etc., and which are typically comprised of water, an acid (such as sulfuric acid), metallic salt, and additives (such as levelers, suppressors, surfactants, accelerators, grain refiners, and pH buffers). The electrochemical deposition system 100 is configured to move the printhead 101 relative to the electrolyte solution 110 such that the deposition anodes 111 of the deposition anode array 113 are submersed in the electrolyte solution 110. When submersed in the electrolyte solution 110, as shown in FIG. 1, when the build plate 102 and at least one of the deposition anodes 111 are connected to a power source 119, and when an electrical current is supplied to the deposition anodes 111 from the power source 119, an electrical path (or current) is formed through the electrolyte solution 110 from each one of the deposition anodes 111 to a conductive surface 131 of a cathode portion 120 of the build plate 102. In such an example, the cathode portion 120 functions as the cathode the cathode-anode circuit of the electrochemical deposition system 100. The electrical paths in the electrolyte solution 110 induce electrochemical reactions in the electrolyte solution 110, between the deposition anodes 111 and the conductive surface 131 of the cathode portion 120, which results in the formation (e.g., deposition) of material 130 (e.g., layers of metal) on the conductive surface 131 of the cathode portion 120 at locations corresponding to the locations of the deposition anodes 111. The material 130, which can be layers of metal, formed by supplying electrical current to multiple deposition anodes 111 form one or more layers or portions of a part in some examples.

Multiple layers, in a stacked formation, at a given location on the cathode portion 120 of the build plate 102 can be formed by incrementally moving the build plate 102, and thus the cathode portion 120, away from the depositions anodes 111 and consecutively supplying an electrical current to the deposition anode 111 corresponding with that location. The material 130 can have an intricate and detailed shape by modifying or alternating the current flowing through the deposition anodes 111. For example, as shown in FIG. 1, first ones of the deposition anodes 111 are energized (shaded in FIG. 1), so that the material 130 is being deposited near these "energized" deposition anodes 111, when second ones of the deposition anodes are not energized (unshaded in FIG. 1), so that the material 130 is not being deposited near these "non-energized" deposition anodes 111.

In some examples, the electrochemical deposition system 100 further includes a processor 122. The printhead 101 is electrically coupled with the processor 122 such that the processor 122 can transmit electrical signals to the grid control circuit 103. In response to receipt of the electrical signals from the processor 122, the grid control circuit 103 sends corresponding electrical signals to the deposition control circuits 115 to selectively turn one or more of the deposition anodes 111 of the deposition anode array 113 on or off (or to modify the intensity of electrical current flow through each deposition anode 111). The processor 122 may be, for example and without limitation, a microcontroller, a microprocessor, a GPU, a FPGA, a SoC, a single-board computer, a laptop, a notebook, a desktop computer, a server, or a network or combination of any of these devices.

According to certain examples, the electrochemical deposition system 100 additionally includes one or more sensors 123. The processor 122 is electrically coupled with the sensors 123 to receive feedback signals from the sensors 123. The feedback signals include sensed characteristics of the electrochemical deposition system 100 that enable a determination of the progress of the metal deposition process for forming the material 130. The sensors 123 may include, for example and without limitation, current sensors, voltage sensors, timers, cameras, rangefinders, scales, force sensors, and/or pressure sensors.

One or more of the sensors 123 can be used to measure a distance between the cathode portion 120 and the deposition anode array 113. Measuring the distance between the cathode portion 120 and the deposition anode array 113 enables "zeroing" of the deposition anode array 113 relative to the cathode portion 120 before the material 130 is formed, or to set or confirm the relative position between the deposition anode(s) 111 and cathode portion 120 before forming each successive metal layer of the material 130. The accurate positioning of the cathode portion 120 relative to the deposition anode array 113 at the initialization of the deposition process may have a significant impact on the success and quality of the completed deposit. In certain examples, any of various types of sensors, for determining the distance between the cathode portion 120 and the deposition anode array 113 can be used, including, for example and without limitation, mechanical, electrical, or optical sensors, or combinations thereof. In one or more examples, mechanical sensors, such as a pressure sensor, switch, or load cell may be employed, which detects when the build plate 102, including the cathode portion 120, is moved and relocated into a desired location. In one or more examples, one or more components of the electrochemical deposition system 100 may be energized, and the cathode portion 120 may be moved into proximity of the energized components. When a corresponding voltage or current is detected on the cathode portion 120, the cathode portion 120 can be considered to be in a known location. According to some examples, other types of sensors, such as those that detect, for example, capacitance, impedance, magnetic fields, or that utilize the Hall Effect, can be used to determine the location of the cathode portion 120 relative to the deposition anode array 113.

Referring to FIG. 1, the electrochemical deposition system 100 further includes a mounting system 195 and a positioning system 199, which includes a position actuator 124. As shown in the illustrated example, the build plate 102 is coupled to the position actuator 124, or an additional or alternative position actuator of the positioning system 199, via the mounting system 195. The mounting system 195 is configured to retain the build plate 102 and to enable the cathode portion 120 of the build plate 102 to be positioned in the electrodeposition cell 191. Actuation of the position actuator 124 moves the mounting system 195 and the build plate 102 relative to the printhead 101 (and thus relative to the deposition anode array 113). However, in other examples, the printhead 101, rather than the build plate 102, is coupled to the position actuator 124 such that actuation of the position actuator 124 moves the printhead 101 relative to the build plate 102. In yet other examples, both the build plate 102 and the printhead 101 are coupled to the position actuator 124, such that actuation of the position actuator 124 results in one or both of the build plate 102 and the printhead 101 moving relative to the other.

The position actuator 124 can be a single actuator or multiple actuators that collectively form the position actuator 124. In certain examples, the position actuator 124 controls vertical movement 125, so that the build plate 102 may be raised, relative to the printhead 101, as successive layers of the material 130 are built. Alternatively, or additionally, in some examples, the position actuator 124 controls vertical movement 125, so that the printhead 101 may be lowered, relative to the build plate 102, as successive layers of the material 130 are built. In one or more examples, the position actuator 124 also moves the build plate 102, moves the printhead 101, or moves both the build plate 102 and the printhead 101 horizontally, relative to one another, so that, for example, parts having a footprint larger than the footprint of the deposition anode array 113 can be formed (see, e.g., dashed directional arrows associated with the directional arrow corresponding with the vertical movement 125).

Although not shown with particularity in FIG. 1, in one or more examples, the electrochemical deposition system 100 includes a fluid handling system fluidically coupled with the electrodeposition cell 191. The fluid handling system may include for example a tank, a particulate filter, chemically resistant tubing, and a pump. The electrochemical deposition system 100 can further include analytical equipment that enables continuous characterization of bath pH, temperature, and ion concentration using methods such as conductivity, high performance liquid chromatography, mass spectrometry, cyclic voltammetry stripping, spectrophotometer measurements, or the like. Bath conditions may be maintained with a chiller, heater and/or an automated replenishment system to replace solution lost to evaporation and/or ions of deposited material.

Although the electrochemical deposition system 100 shown in FIG. 1 has a single printhead 101 with a single deposition anode array 113, in one or more alternative examples, the electrochemical deposition system 100 includes multiple printheads 101, each with one or more deposition anode arrays 113, or a single printhead 101 with multiple deposition anode arrays 113. These multiple deposition anode arrays 113 may operate simultaneously in different chambers filled with electrolyte solution, or may be tiled in a manner where the deposition anode arrays 113 work together to deposit material on a shared build plate or series of build plates.

Figure 15:
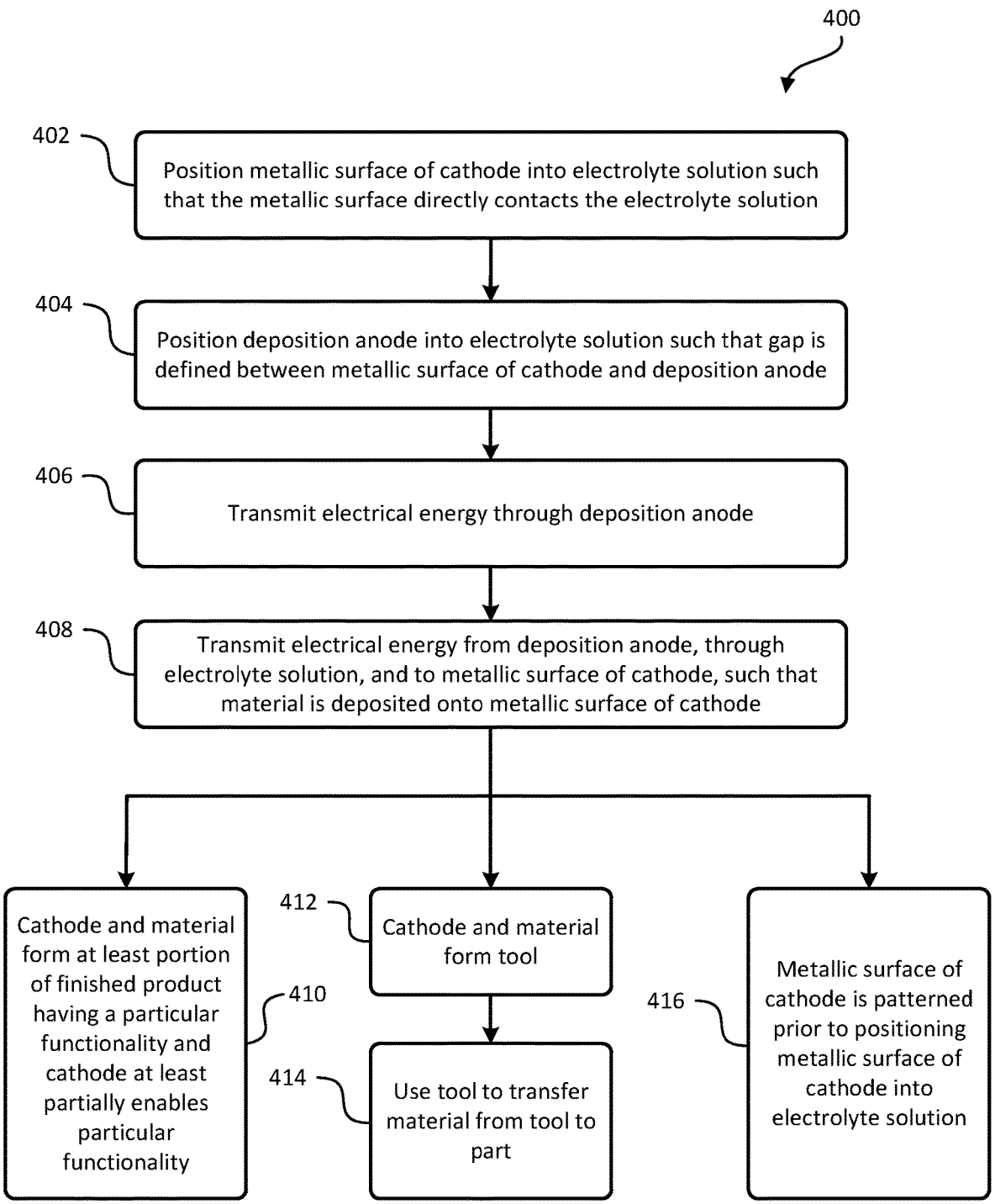
FIG. 15 is a block diagram of an electrochemical additive manufacturing method, according to one or more examples of the present disclosure.

Referring to FIG. 15, according to some examples, an electrochemical additive manufacturing method 400 includes (block 402) positioning the conductive surface 131 of the cathode portion 120 of the build plate 102 into the electrolyte solution 110 such that the conductive surface 131 directly contacts the electrolyte solution 110. The method 400 additionally includes (block 404) positioning the deposition anode 111 into the electrolyte solution 110 such that a gap 133 is defined between the conductive surface 131 of the cathode portion 120 and the deposition anode 111. The method 400 further includes (block 406) transmitting electrical energy through the deposition anode 111. As presented above, the electrical energy can be supplied by the electrical power source 119. The method 400 also includes (block 408) transmitting the electrical energy from the deposition anode 111, through the electrolyte solution 110, and to the conductive surface 131 of the cathode portion 120, such that the material 130 is deposited onto the conductive surface 131 of the cathode portion 120. The material 130 deposited directly onto the conductive surface 131 is a first layer of the material 130.

The above-mentioned steps can be executed consecutively any number of times to deposit additional portions of the material 130 onto previously deposited layers of the material 130. Moreover, an additional layer of the material 130 can be deposited onto a previously deposited layer directly above and/or laterally offset from the previously deposited layer. In this manner, the method 400 can be executed to form the material 130 into any of various types of components that have vertical features, horizontal features, or some combination of vertical and horizontal features, such as overhangs. Some examples include columns, pillars, walls, bumps, traces, pads, horizontal layers, coils, antennas, resistors, capacitors, connectors, thermal management features, such as pins, fins, lattices, vapor chambers, heat pipes, etc.

After the material 130 is deposited onto the cathode portion 120, in some examples, at block 410 of the method 400, the build plate 102, including the cathode portion 120, and the material 130 form (or are formed into) a finished product or, at block 412 of the method 400, the build plate 102, including the cathode portion 120, form a tool and, at block 414, the tool is used to help form the material 130 into a finished product. Additionally, or alternatively, in certain examples, at block 416 of the method 400, the cathode portion 120 is patterned prior to depositing the material 130 onto the cathode portion 120. Accordingly, referring to FIG. 15, after the material 130 is deposited onto the conductive surface 131 of the cathode portion 120 at block 408, the method 400 proceeds to execute at least one of block 410, blocks 412-414, or block 416.

As shown in FIG. 15, according to some examples, at block 410 of the method 400, the build plate 102 and the material 130 form at least a portion of a finished product 200 having a particular functionality and the build plate 102 at least partially enables the particular functionality. According to block 410, the material 130 is not removed from the cathode portion 120 to form the material 130 into a finished product. Additionally, the build plate 102, and the cathode portion 120 of the build plate 102, do not provide a mere nominal function in relation to the main function or functions of the finished product. For example, when the material 130 is formed into an artistic object (e.g., sculpture), the main function of the artistic object is to provide an aesthetically pleasing visual work of art. Accordingly, if the build plate 102 does not contribute to the aesthetic quality of the artistic object, such as if the build plate 102 merely provides a stand on which the artistic object is supported, the function of the build plate 102 is merely nominal compared to the main function of the artistic object and is not required to fulfill the main function of the artistic object. However, when the build plate 102 is required for the finished product to operate, then the build plate 102 at least partially enables the particular functionality of the finished product. For example, the build plate 102 can include a self-supporting structure and the material 130 forms a non-self supporting structure, such as a thin-walled structure, that is supported by the self-supporting structure.

The build plate 102 includes prefabricated features in some examples. The prefabricated features can provide any of various functionality and be pre-formed (e.g., prior to depositing the material 130 onto the build plate 102) using any of various processes, such as one or more of casting, forging, rolling, cutting, grinding, and drilling. In certain examples, the build plate 102 includes a prefabricated thermal feature that is configured to transfer heat. The material 130 deposited onto the build plate 102 is thermally coupled with the thermal feature(s) of the build plate 102 to promote heat transfer by or to the thermal feature.

Figure 2:
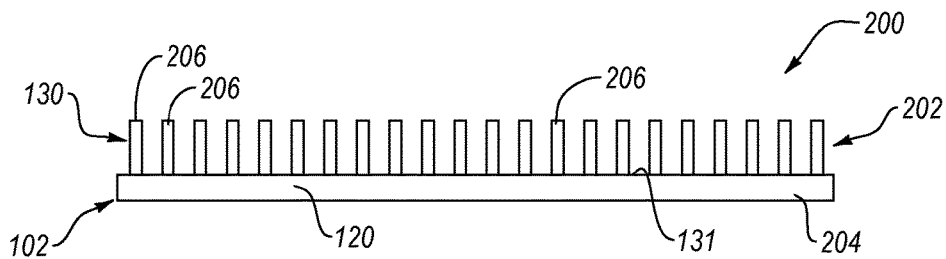
FIG. 2 is a schematic, side elevation view of a heat exchanger made by and including a cathode portion of a build plate of the system of FIG. 1, according to one or more examples of the present disclosure.

Referring to FIG. 2, according to one example, the finished product 200 includes a heat exchanger 202, that may be, for example, a thermal management feature including, but not limited to, pins, fins, lattices, vapor chambers, and/or heat pipes. The heat exchanger 202 includes a plate 204 and at least one fin 206 attached to the plate 204. In the illustrated example, the heat exchanger 202 includes a plurality of fins 206. The heat exchanger 202 defines the build plate 102, such that the build plate 102 includes the plate 204 and the at least one fin 206. The prefabricated thermal feature of the build plate 102 can be the plate 204 or the at least one fin 206. The build plate 102 illustrated in FIG. 2, which defines a complex cathode structure, can be prefabricated using one or more manufacturing methods, such as electrochemical deposition, machining, dip brazing, etc. In some examples, an entirety of the build plate 102 is made of an electrically conductive material. Accordingly, in such examples, the cathode portion 120 is the entirety of the build plate 102. In other words, the cathode portion 120 includes the plate 204 and the at least one fin 206 of the heat exchanger 202.

Referring to FIGS. 3A-6C, in some examples, the heat exchanger 202 includes a fluid channel 212 and a heat wicking feature (e.g., a lattice 208) located within the fluid channel 212. In some examples, the lattice 208 is porous and permeable in a manner consistent with heat pipe wicking. The fluid channel 212 is defined, at least partially, by the plate 204, which defines the cathode portion 120 of the build plate 102.

Figure 3A:
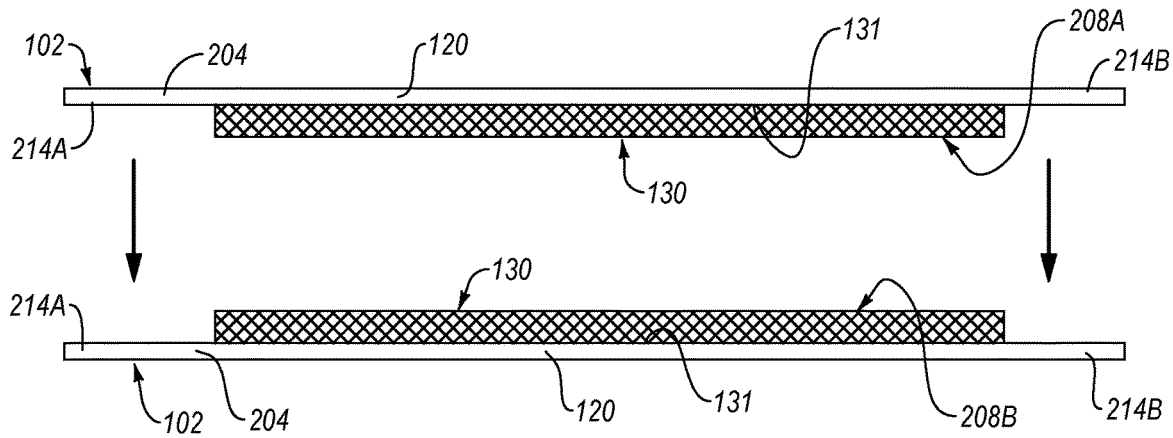
FIG. 3A is a schematic, side elevation view of a vapor chamber being assembled, according to one or more examples of the present disclosure.
Figure 3B:
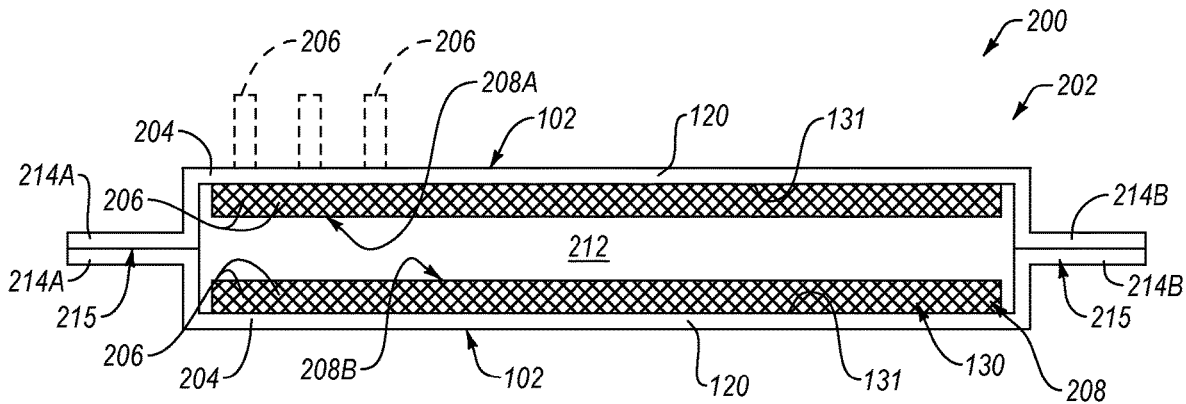
FIG. 3B is a schematic, side elevation view of a vapor chamber made by and including cathode portions of build plates of the system of FIG. 1, according to one or more examples of the present disclosure.

Referring to FIGS. 3A and 3B, in some examples, the heat exchanger 202 is made using two separate build plates 102 (e.g., plates 204) with each build plate 102 defining a portion of the fluid channel 212. The material 130 is deposited on the conductive surfaces 131 of the cathode portions 120 of the build plates 120. Because the plates 204 are made of an electrically conductive material, the plates 204 define the cathode portions 120. The material 130 on the cathode portion 120 of a first one of the build plates 102 forms a first portion 208A of the lattice 208 and the material 130 on the cathode portion 120 of a second one of the build plates 102 forms a second portion 208B of the lattice 208. Each one of the build plates 102 has a first free end 214A or side, and a second free end 214B or side that is opposite the first free end 214A. With the first portion 208A and the second portion 208B facing each other, as shown in FIG. 3A, the build plates 102 are brought together, the first free ends 214A of the build plates 102 are sealed together at location 215, and the second free ends 214B of the build plates 102 are sealed together at location 215. In some examples, the free ends of the build plates 102 are sealed together via welding, soldering, brazing, adhering, fastening, and/or the like. The unsealed portions of the build plates 102 define the fluid channel 212. In some examples, the first free ends 214A and the second free ends 214B of at least one of the build plates 102 is bent to enable a space between the build plates 102 and between the first portion 208A and the second portion 208B of the lattice 208. As shown in FIG. 3B, in some examples, one or more of the build plates 102 (e.g., plates 204) includes one or more fins 206 such that the fins 206 are located outside the fluid channel 212.

Figure 4A:
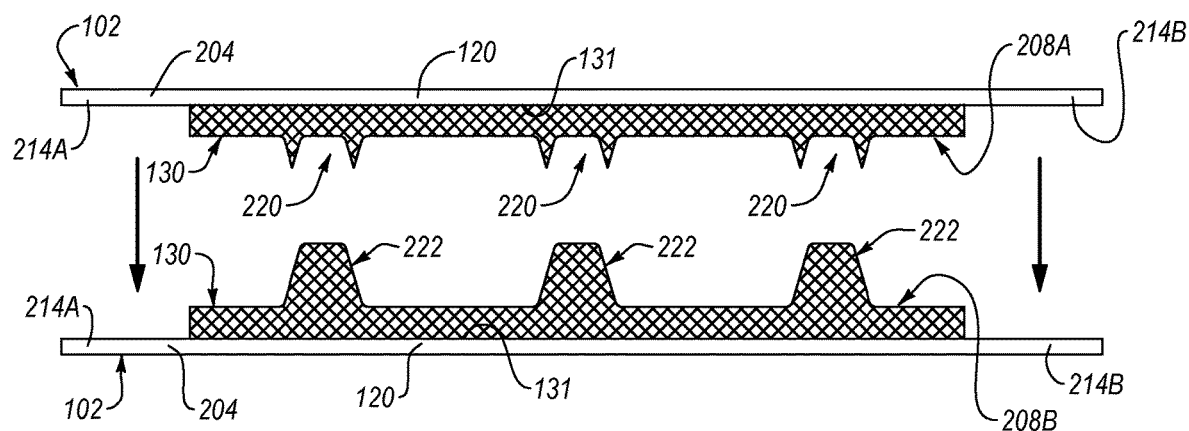
FIG. 4A is a schematic, side elevation view of a vapor chamber being assembled, according to one or more examples of the present disclosure.
Figure 4B:
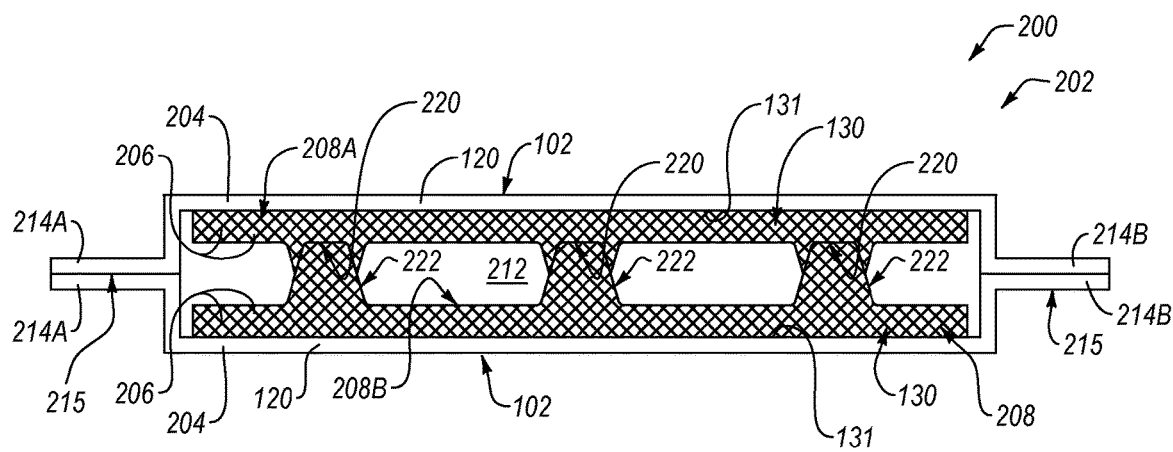
FIG. 4B is a schematic, side elevation view of a vapor chamber made by and including cathode portions of build plates of the system of FIG. 1, according to one or more examples of the present disclosure.

Referring to FIGS. 4A and 4B, in some examples, there is no space between the first portion 208A and the second portion 208B of the lattice 208 at one or more locations along the lattice 208. In other words, in some examples, the first portion 208A and the second portion 208B of the lattice 208 contact each other at one or more locations, which helps to add stiffness or increase the rigidity of the fluid channel 212. To help secure the first portion 208A relative to the second portion 208B, in some examples, the first portion 208A and the second portion 208B are nestably engaged at one or more locations along the lattice 208. In the illustrated example, the first portion 208A includes recesses 220 and the second portion 208B includes protrusions 222. Each one of the protrusions 222 is nestably inserted into a corresponding one of the recesses 220 when the first free ends 214A and the second free ends 214B are sealed together. Although the lattice 208 of the heat exchanger 202 of FIG. 4B includes three recesses 220 and three protrusions 222, it is recognized that the heat exchanger 202 can include less than three (e.g., one) or more than three recesses 220 and less than three (e.g., one) or more than three protrusions 222.

Figure 5A:
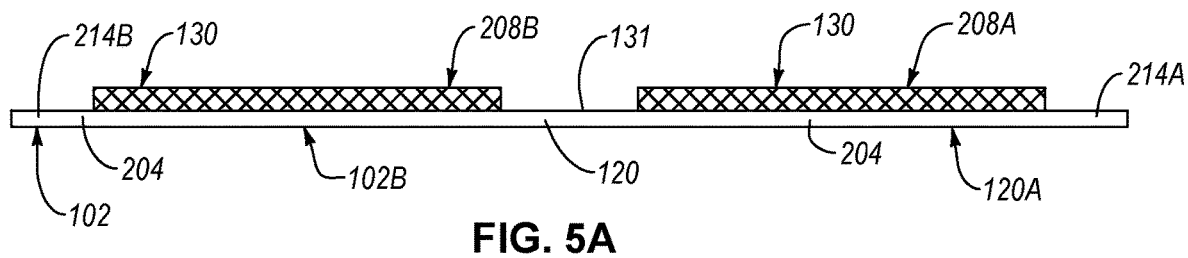
FIG. 5A is a schematic, side elevation view of a cathode portion of a build plate, and material deposited on the cathode portion using the system of FIG. 1, according to one or more examples of the present disclosure.
Figure 5B:
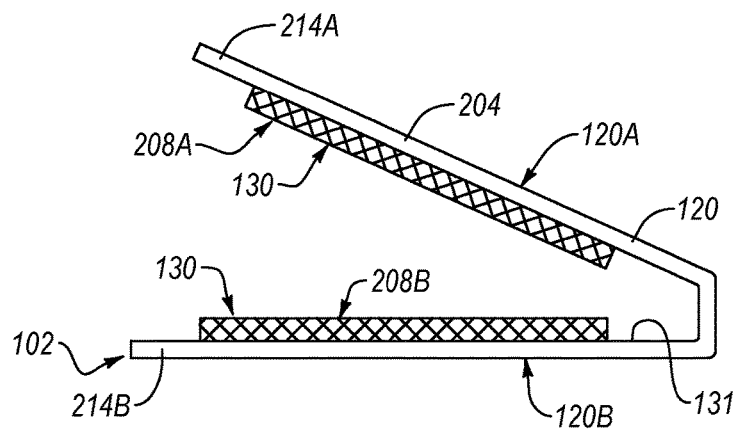
FIG. 5B is a schematic, side elevation view of a vapor chamber being assembled, according to one or more examples of the present disclosure.
Figure 5C:
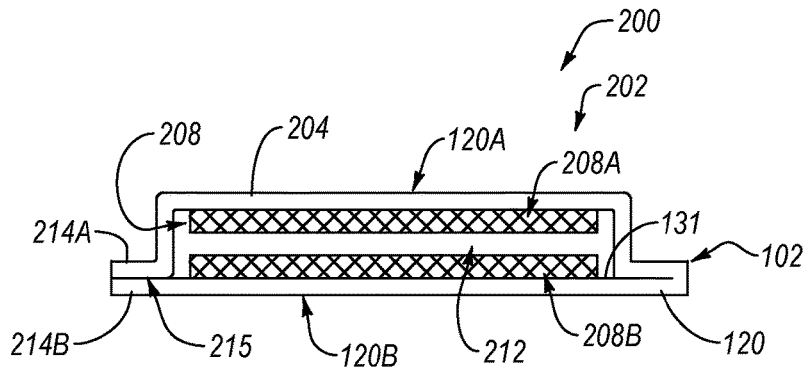
FIG. 5C is a schematic, side elevation view of a vapor chamber made by and including cathode portions of build plates of the system of FIG. 1, according to one or more examples of the present disclosure.

Referring to FIGS. 5A and 5C, in some examples, the heat exchanger 202 is made by depositing the material 130 on the conductive surface 131 of the cathode portion 120 of a single build plate 102. The material 130 on the build plate 102, which is deposited on the same conductive surface 131 of the cathode portion 120 of the build plate 102, is separated into a first portion 208A of the lattice 208 and a second portion 208B of the lattice 208. The first portion 208A is deposited onto a first portion 120A of the build plate 102 (e.g., a first portion of the cathode portion 120 of the build plate 102) and the second portion 208B is deposited onto a second portion 120B of the build plate 102 (e.g., a second portion of the cathode portion 120 of the build plate 102). The build plate 102 has a first free end 214A and a second free end 214B that is opposite the first free end 214A. With the first portion 208A and the second portion 208B of the lattice 208 facing in the same direction, as shown in FIG. 5A, the build plate 102 is bent at a location between the first portion 120A and the second portion 120B of the build plate 102 and between the first portion 208A and the second portion 208B of the lattice 208 (see, e.g., FIG. 5B). The build plate 102 is thus folded back over itself until the first portion 208A and the second portion 208B of the lattice 208 face each other (see, e.g., FIG. 5C). In this position, the first free end 214A and the second free end 214B of the build plate 102 are brought together and sealed. The unsealed portion of the first portion 120A and the second portion 120B of the build plate 102 define the fluid channel 212. In some examples, one or both of the first free end 214A and the second free end 214B of the build plate 102 is bent, and the fold of the build plate 102 can be configured, to enable a space between the first portion 208A and the second portion 208B of the build plate 102 and between the first portion 208A and the second portion 208B of the lattice 208. According to this example, the build plate 102 is made of a conductive material, and has a size and shape, that enables bending of the build plate 102. As used herein, unless otherwise noted, conductive means electrically conductive.

Figure 6A:
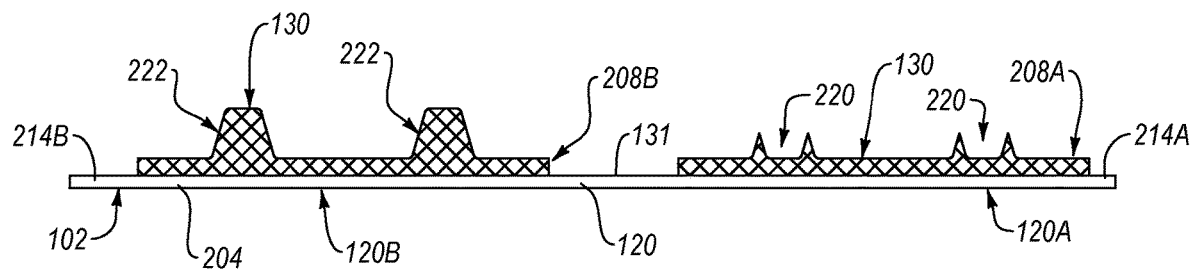
FIG. 6A is a schematic, side elevation view of a cathode portion of a build plate and material deposited on the cathode portion using the system of FIG. 1, according to one or more examples of the present disclosure.
Figure 6B:
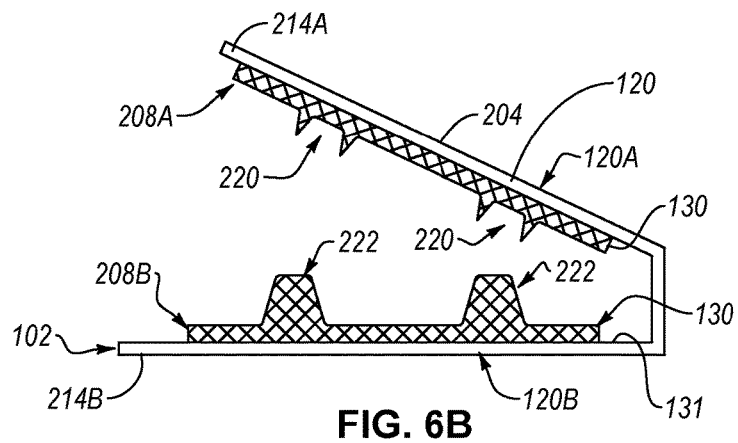
FIG. 6B is a schematic, side elevation view of a vapor chamber being assembled, according to one or more examples of the present disclosure.
Figure 6C:
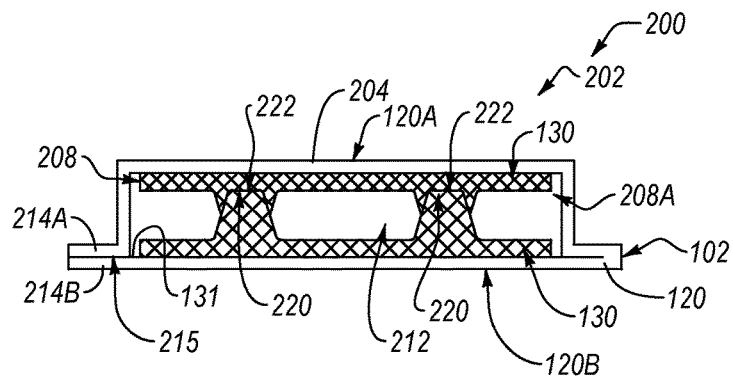
FIG. 6C is a schematic, side elevation view of a vapor chamber made by and including a cathode portion of a build plate of the system of FIG. 1, according to one or more examples of the present disclosure.

Referring to FIGS. 6A-6C, in some examples, there is no space between the first portion 208A and the second portion 208B of the lattice 208 at one or more locations along the lattice 208 after the build plate 102 is bent. In other words, in some examples, the first portion 208A and the second portion 208B of the lattice 208 contact each other at one or more locations, which helps to add stiffness or increase the rigidity of the heat exchanger 202. To help secure the first portion 208A relative to the second portion 208B, in some examples, the first portion 208A and the second portion 208B are nestably engaged at one or more locations along the lattice 208. In the illustrated example, the first portion 208A includes recesses 220 and the second portion 208B includes protrusions 222. Each one of the protrusions 222 is nestably inserted into a corresponding one of the recesses 220 as the first portion 120A of the build plate 102 is bent over the second portion 120B of the build plate 102, and when the first free ends 214A and the second free ends 214B are sealed together. Although the lattice 208 of the heat exchanger of FIG. 6C includes three recesses 220 and three protrusions 222, it is recognized that the lattice 208 can include less than three (e.g., one) or more than three recesses 220 and less than three (e.g., one) or more than three protrusions 222.

Now Referring to FIGS. 7A-8B, according to some examples, the finished product 200 is a lead-frame package 250. The lead-frame package 250 includes a lead frame 240, a die 230, and a wire 234. The wire 234 is attached to and extends between the lead frame 240 and the die 230. More specifically, the wire 234 is attached to and extends between a lead-frame terminal 244 of the lead frame 240 and a die terminal 232 of the die 230. When attached to the lead-frame terminal 244 and the die terminal 232, the wire 234 electrically couples the die 230 to the lead frame 240. The die 230 includes a non-conductive substrate 231 and the die terminal 232, which is made of a conductive material, is formed in or on the non-conductive substrate 231. Similarly, the lead frame 240 includes a non-conductive substrate 242 and the lead-frame terminal 244, which is made of a conductive material, is formed in or on the non-conductive substrate 242. Some examples may include other semiconductor packaging substrate types such as ceramic-based (DBC), laminate-based (BGA), glass (interposer), etc.

The die 230 is an integrated circuit (e.g., semiconductor die) in some examples. Accordingly, in such examples, the non-conductive substrate 231 is made of a semiconducting material and the die 230 includes a functional circuit formed into the semiconducting material.

As illustrated, in some examples, the die 230 includes a plurality of die terminals 232, the lead frame 240 includes a plurality of lead-frame terminals 244, and the lead-frame package 250 includes a plurality of wires 234. Each one of the plurality of wires 234 is attached to and electrically connects a corresponding one of the plurality of die terminals 232 to a corresponding one of the plurality of lead-frame terminals 244. In one example, the plurality of die terminals 232 are arranged around a perimeter of the die 230 and the plurality of lead-frame terminals 244 are arranged around the die 230, such that the die 230 is surrounded by the lead-frame terminals 244 and the wires 234 are attached to and extend from all sides of the die 230.

Figure 7A:
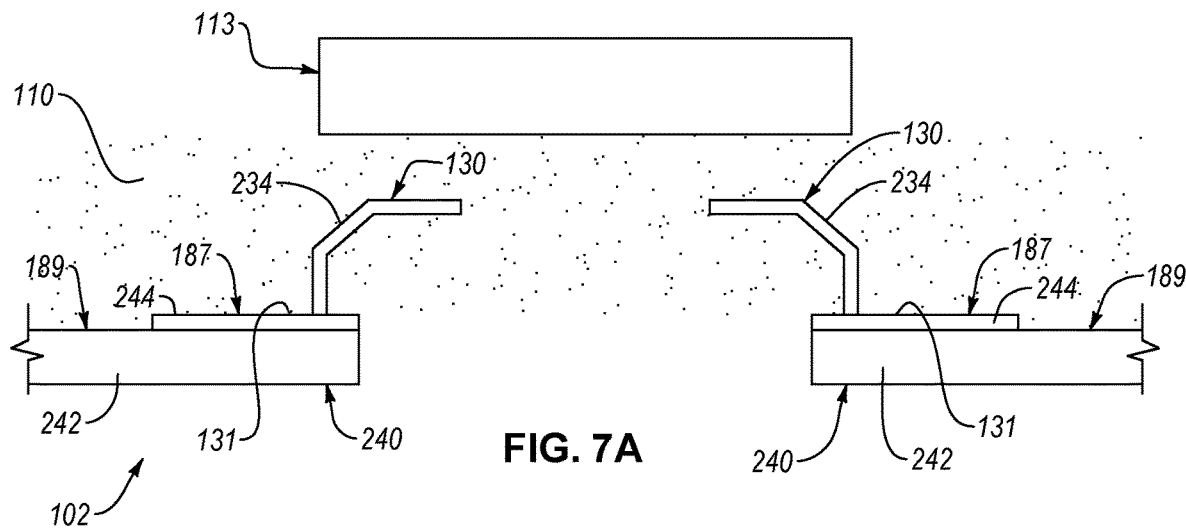
FIG. 7A is a schematic, side elevation view of material being deposited onto a cathode portion of a build plate using the system of FIG. 1, according to one or more examples of the present disclosure.
Figure 7B:
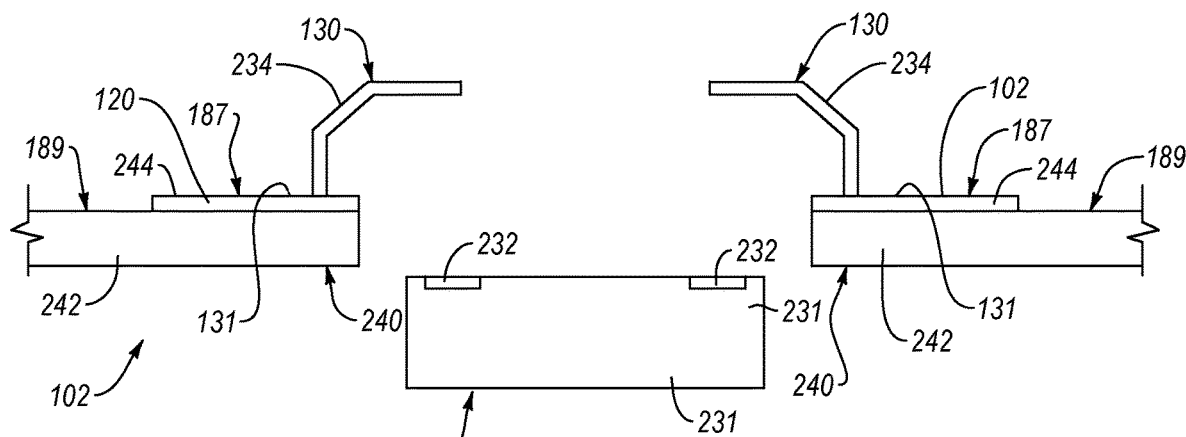
FIG. 7B is a schematic, side elevation view of a lead frame package being assembled, according to one or more examples of the present disclosure.
Figure 7C:
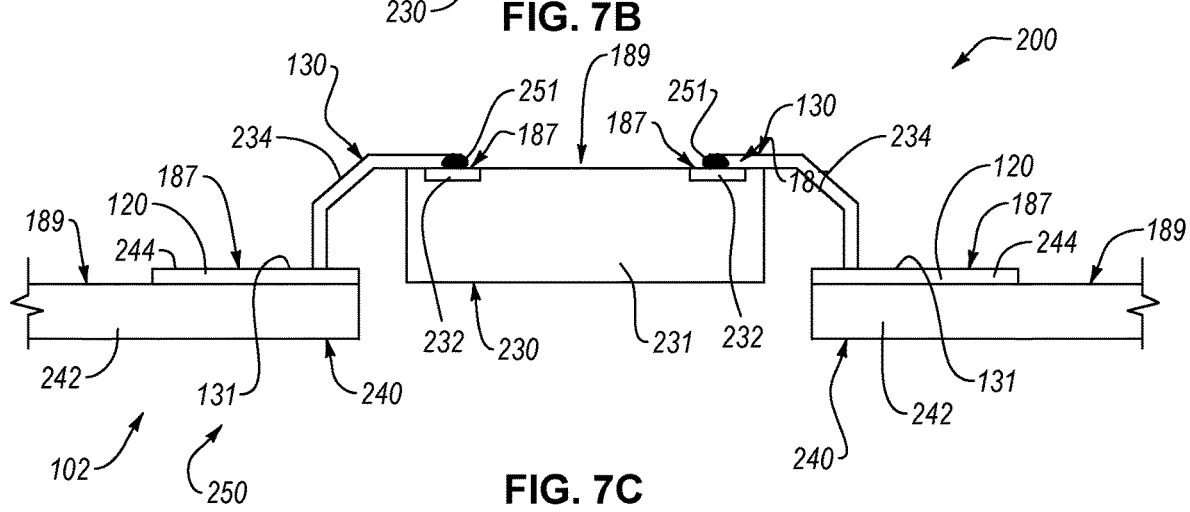
FIG. 7C is a schematic, side elevation view of a lead frame package made by and including a cathode portion of a build plate of the system of FIG. 1, according to one or more examples of the present disclosure.

In one example, shown in FIGS. 7A-7C, the build plate 102 forms only the lead frame 240 and the material 130 deposited onto the lead frame 240 forms the entirety of the wire 234 or the wires 234 of the lead-frame package 250.

Unlike the build plate 102 shown in FIGS. 2-6C, in which the cathode portion 102 is formed of an entirety of the build plate 102, the cathode portion 120 of the build plate 102 in FIGS. 7A-7C forms only a portion of the build plate 102. More specifically, the cathode portion 120 is just the lead-frame terminals 244 and the conductive surface 131 is a surface of the lead-frame terminals 244, with the non-conductive substrate 242 forming a remainder of the build plate 102. As shown, the lead frame 240, acting as the build plate 102, is positioned in the electrolyte solution 110 such that a gap is defined between the lead-frame terminals 244 and the deposition anode array 113. Electrical energy is then supplied to the deposition anode array 113 such that the wires 234 form on the lead-frame terminals 244. In the present example, the wires 234 are formed with an overhang such that free ends of the wires 234 extends out over an opening or recess in the lead frame 240. After the wires 234 are completely formed, the build plate 102, which in this example is the lead frame 240, is removed from the electrolyte solution 110.

Referring to FIG. 7B, the die 230 is then moved into an attachment position in the opening or recess in the lead frame 240. Movement of the die 230 can be performed manually or automatically. In the attachment position, the die terminals 232 are in a position, relative to free ends of the wires 234 (e.g., in contact with the free ends of the wires 234), ready for attachment of free ends of corresponding ones of the wires 234 to the die terminals 232. As shown in FIG. 7C, attachment of the free ends of the wires 234 to the die terminals 232 is accomplished with solder 251 via a soldering process. In the attachment position, the die terminals 232 and the lead-frame terminals 244 can be on different planes, as shown in FIG. 7C. However, in other examples, the die terminals 232 and the lead-frame terminals 244 are on the same plane.

Although in the example shown in FIGS. 7A-7C, the build plate 102 forms only the lead frame 240, in other examples, the build plate 102 can form only the die 230. In such examples, the material 130 is deposited onto die terminals 232 of the die 230 in the presence of the electrolyte solution 110 and the material 130 forms the entirety of the wire 234 or the wires 234 of the lead-frame package 250. The wires 234 would be formed with an overhang such that free ends of the wires 234 extends out over and beyond a periphery of the die 230. After the wires 234 are completely formed, the die 230 is removed from the electrolyte solution 110 and the lead frame 240 is moved into an attachment position around the die 230. Movement of the lead frame 240 can be performed manually or automatically. In the attachment position, the lead-frame terminals 244 are in a position, relative to free ends of the wires 234 (e.g., in contact with the free ends of the wires 234), ready for attachment of free ends of corresponding ones of the wires 234 to the lead-frame terminals 244

Figure 8A:
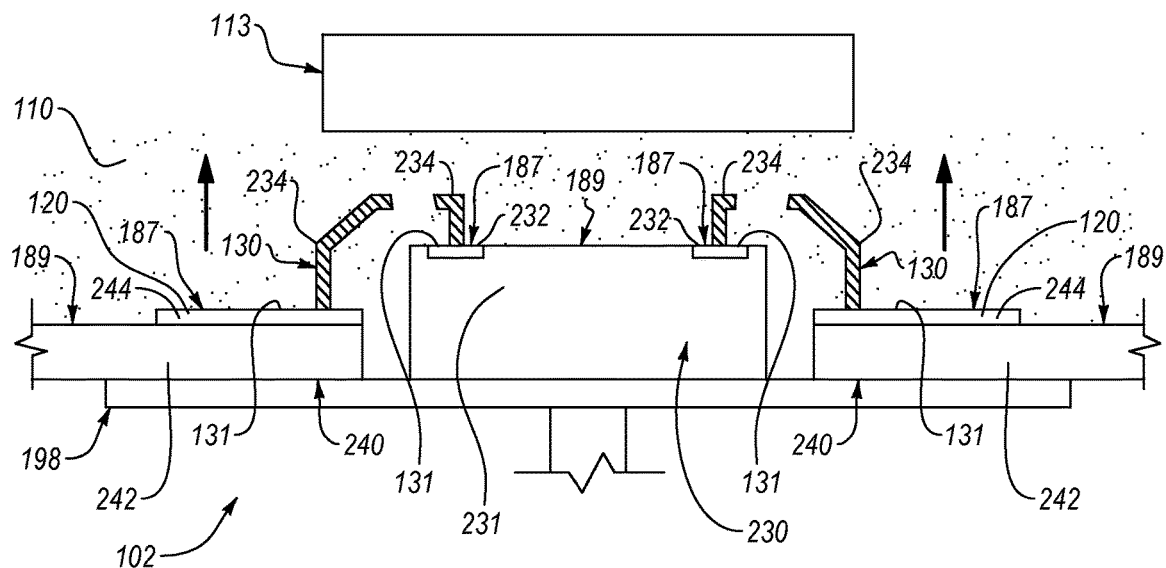
FIG. 8A is a schematic, side elevation view of material being deposited onto a cathode portion of a build plate using the system of FIG. 1, according to one or more examples of the present disclosure.
Figure 8B:
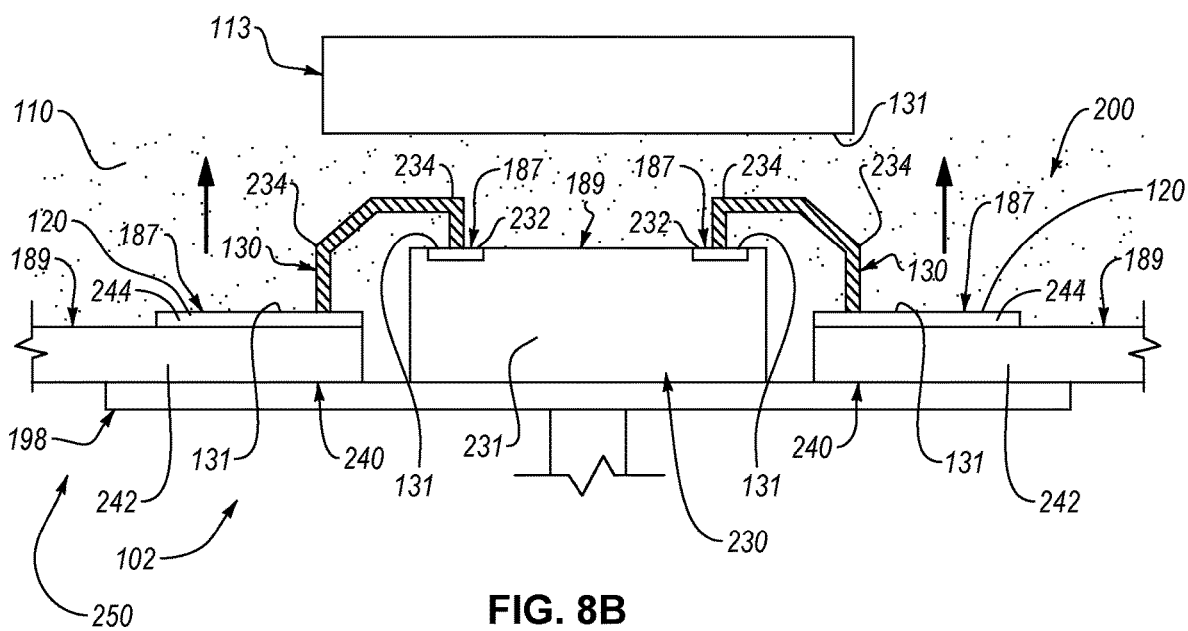
FIG. 8B is a schematic, side elevation view of a lead frame package made by and including a cathode portion of a build plate of the system of FIG. 1, according to one or more examples of the present disclosure.

Referring now to FIGS. 8A and 8B, the build plate 102 forms both the lead frame 240 and the die 230 of the lead-frame package 250, which can be supported on a support plate 198 and movable relative to the deposition anode array 113 via actuation of the support plate 198. Unlike the build plate 102 shown in FIGS. 2-6C, in which the cathode portion 102 is formed of an entirety of the build plate 102, the cathode portion 120 of the build plate 102 in FIGS. 8A-8C forms only a portion of the build plate 102. More specifically, the cathode portion 120 is just the lead-frame terminals 244 and the die terminals 232 and the conductive surface 131 is a surface of the lead-frame terminals 244 and the die terminals 232, with the non-conductive substrate 242 and the non-conductive substrate 231 forming a remainder of the build plate 102. Accordingly, the material 130 is deposited onto both the lead-frame terminals 244 of the lead frame 240 and the die terminals 232 of the die, to form the wires 234 of the lead-frame package 250, when the lead frame 240 and the die 230 are positioned in the electrolyte solution 110. After the wires 234 are completely formed, the lead-frame package 250 is removed from the electrolyte solution 110. It can be appreciated that in the example illustrated in FIGS. 8A and 8B, solder is not required to electrically connect the wires 234 to the lead frame 240 and the die 230. The die terminals 232 and the lead-frame terminals 244 can be on different planes, as shown in FIG. 8B when the material 130 is deposited thereon to form the wires 234. However, in other examples, the die terminals 232 and the lead-frame terminals 244 are on the same plane when the material 130 is deposited thereon to form the wires 234.

Figure 10A:
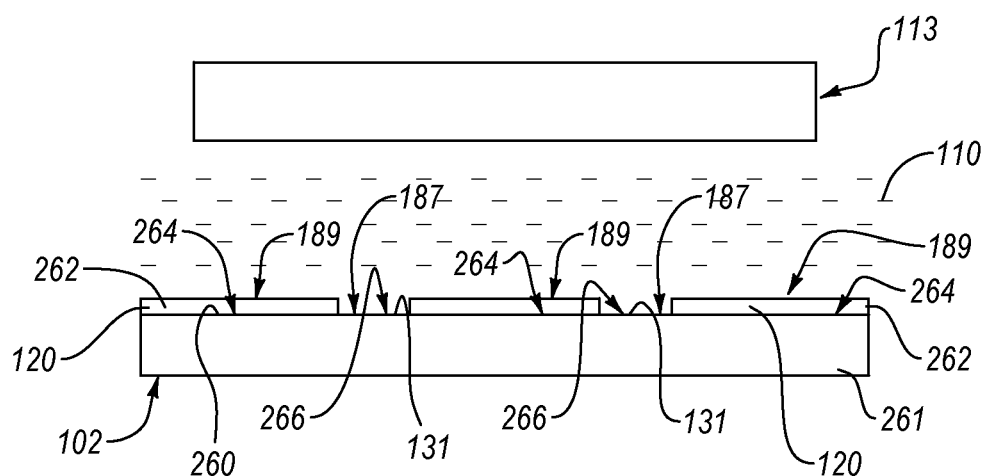
FIG. 10A is a schematic, side elevation view of a deposition anode array and cathode portion of a build plate, having a photomask layer, of the system of FIG. 1, according to one or more examples of the present disclosure.
Figure 10B:
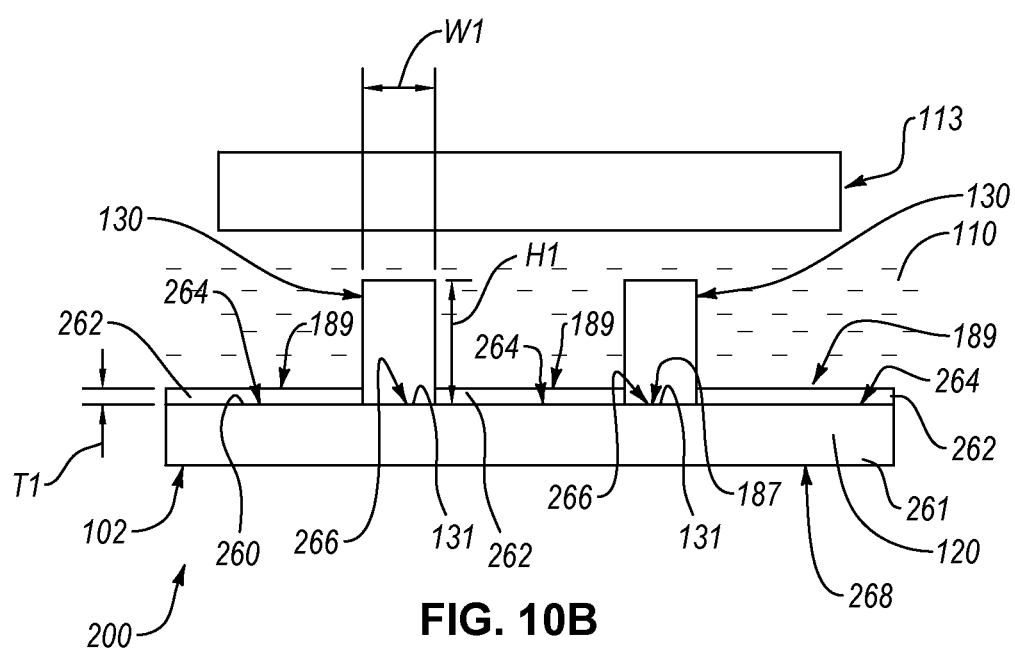
FIG. 10B is a schematic, side elevation view of material being deposited onto the cathode portion of FIG. 10A, according to one or more examples of the present disclosure.

Now referring to FIGS. 10A and 10B, according to some examples, the finished product 200 is an integrated circuit that includes a substrate, such as semiconductor-based wafer 268, and one or more of a pillar, via, or other thin-walled structure formed on the semiconductor-based wafer 268. The semiconductor-based wafer 268 can be made of a semiconductor material, such as, for example, Si (silicon), SiC (silicon carbide), GaN (gallium nitride), MoS2 (molybdenum disulfide), etc. The build plate 102 is the semiconductor-based wafer 268 and the material 130 deposited onto the build plate 102 forms the thin-walled structure. The process for making the integrated circuit of FIGS. 10A and 10B is described in more detail below.

Figure 11A:
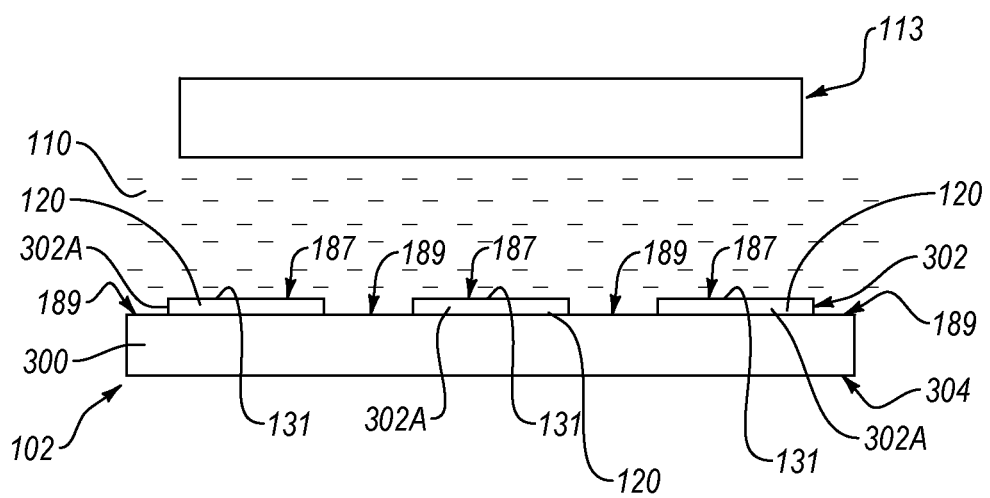
FIG. 11A is a schematic, side elevation view of a deposition anode array and a cathode portion of a build plate, having a pre-applied conductive layer, of the system of FIG. 1, according to one or more examples of the present disclosure.
Figure 11B:
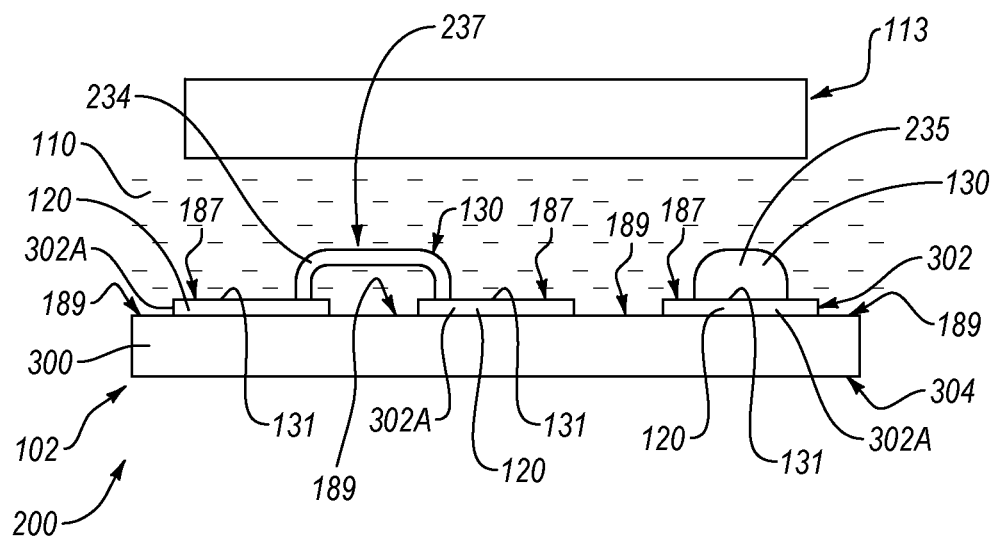
FIG. 11B is a schematic, side elevation view of material being deposited onto the cathode portion of FIG. 11A, according to one or more examples of the present disclosure.

Referring to FIGS. 11A and 11B, according to certain examples, the finished product 200 is a printed circuit board 304 that includes a non-conductive substrate 300 (e.g., dielectric) that has a core layer made of an electrically non-conductive material or a semiconductive material. The printed circuit board 304 also includes a conductive layer 302 on the surface of the non-conductive substrate 300. The conductive layer 302 includes one or more conductive features, such as an electrical pad or an electrical trace (see, e.g., conductive-layer segments 302A) deposited (e.g., attached, printed, applied, painted, etc.) onto the non-conductive substrate 300. The substrate 300 can be a fixed (e.g., rigid) substrate or a flexible substrate.

The printed circuit board 304 also includes electrical components (e.g., wires 234 or bumps 235) that are electrically connected to one or more conductive features of the conductive layer 302. For example, the wire 234 in FIG. 11B electrically connects two conductive-layer segments 302A (e.g., two electrical pads). In some examples, each one of the conductive-layer segments 302A can form part of the same electrical circuit or a corresponding one of multiple electrical circuits formed on or in the non-conductive substrate 300. According to certain examples, the electrical components can be any of various electrical components other than wires or bumps, such as antennas, waveguides, and the like. The electrical components can be configured such that the finished product 200, including the build plate 102, the cathode portion 120, and the material 130, form an electronic sensor, which, in certain examples, is at least one of a thermocouple or a strain gauge. The material 130 forms at least part of a surface mount technology (SMT) passive component or a radio-frequency (RF) component in some examples.

Unlike the build plate 102 shown in FIGS. 2-6C, in which the cathode portion 102 is formed of an entirety of the build plate 102, the cathode portion 120 of the build plate 102 in FIGS. 11A and 11B forms only a portion of the build plate 102. More specifically, the cathode portion 120 is just the conductive layer 302 and the conductive surface 131 is a surface of the conductive layer 302, with the non-conductive substrate 300 forming a remainder of the build plate 102. In other words, the build plate 102 is formed by the non-conductive substrate 300 and the conductive layer 302, and the material 130 deposited onto the build plate 102 forms the electrical components.

Figure 9A:
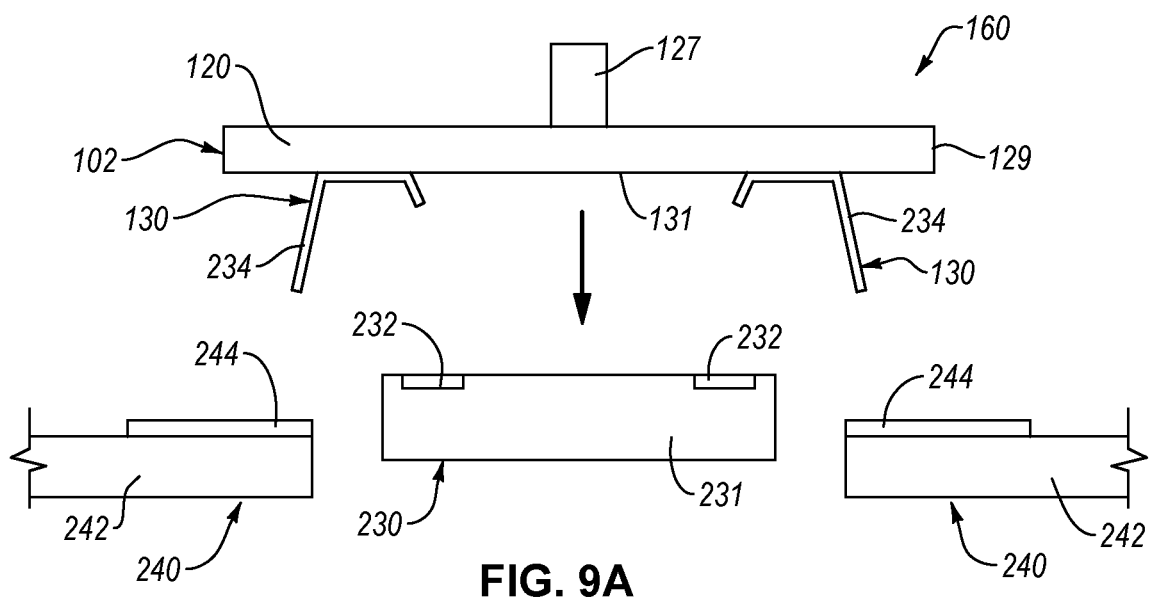
FIG. 9A is a schematic, side elevation view of material being deposited onto a cathode portion of a build plate using the system of FIG. 1, according to one or more examples of the present disclosure.
Figure 9B:
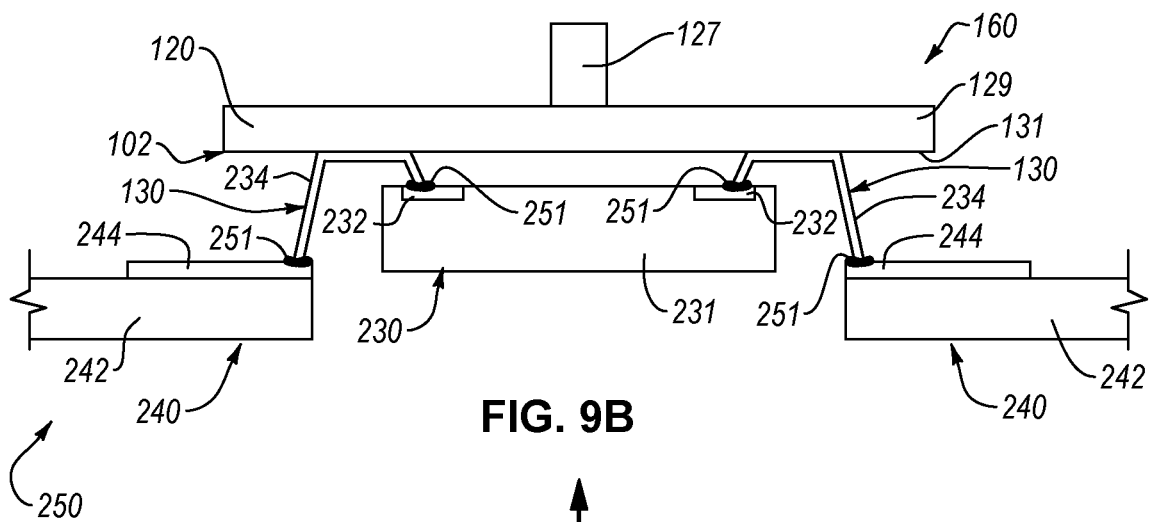
FIG. 9B is a schematic, side elevation view of a tool, including the cathode portion of a build plate of the system of FIG. 1, being used to assemble a lead frame package, according to one or more examples of the present disclosure.
Figure 9C:
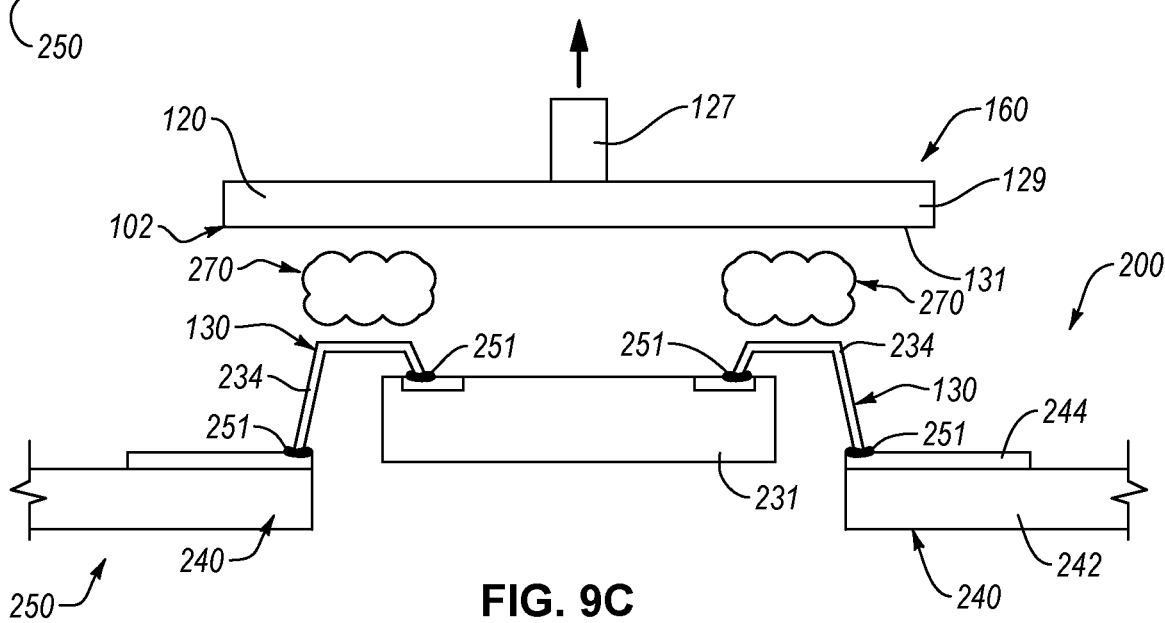
FIG. 9C is a schematic, side elevation view of material being removed from the cathode portion of the tool of FIG. 9B, according to one or more examples of the present disclosure.

As shown in FIG. 15, according to some examples, at block 412 of the method 400, the build plate 102 and the material 130 deposited onto the build plate 102 form a tool 160. Referring to FIGS. 9A-9C, the build plate 102, which can be a plate of conductive material, and the material 130, deposited onto the build plate 102, form a tool 160 that is used to transfer the material 130 from the tool 160 to an object or part. Like the build plate 102 shown in FIGS. 2-6C, the cathode portion 102 of the build plate 102 of the tool 160 is formed of an entirety of the build plate 102. In FIG. 9A, the build plate 102 is shown with the material 130 deposited onto the conductive surface 131 of the cathode portion 120 of the build plate 102. In the illustrated example, the conductive surface 131 is a flat and non-patterned (e.g., all areas of the surface of the cathode portion 120 have the same material deposition characteristics). The material 130 deposited onto the build plate 102 in FIG. 9A forms one or more wires 234. The wires 234 are configured to electrically connect together two electronic devices. In the illustrated example, the two electronic devices are a die 230 and a lead frame 240 of a lead-frame package 250. The wires 234 are formed on the build plate 102 to have a size and shape corresponding to the size and shape, and relative position, of the die 230 and the lead frame 240. Because the wires 234 span a gap between the die 230 and the lead frame 240, the wires 234 are formed on the build plate 102 to have an overhang.

Referring to FIG. 15, according to some examples, at block 414 of the method 400, the tool 160 is used to transfer the material 130 from the tool 160 to a part, such as the lead-frame package 250. As shown in FIG. 9B, with the wires 234 formed on the build plate 102, the build plate 102, functioning as the tool 160, is positioned such that the wires 234 are proximate enough to the lead-frame terminals 244 of the lead frame 240 and the die terminals 232 of the die 230 to attach (e.g. solder), via the solder 251, each one of the wires 234 to a corresponding one of the lead-frame terminals 244 and the die terminals 232. In some examples, the build plate 102 includes a base 129, which defines the cathode portion 120 and the conductive surface 131, and a post 127 or handle extending from the base 129. The post 127 helps facilitate positioning of the tool 160 into position for attaching the wires 234 to the lead-frame package 250. For example, the post 127 can be secured by a user, whether manually or automatically, and, while securing the post 127, the build plate 102 can be moved into position by virtue of moving the post 127. According to some examples, the post 127 is also used to secure the build plate 102 to the electrochemical deposition system 100.

Referring to FIG. 9C, after the wires 234 are soldered, or otherwise attached, to the lead frame 240 and to the die 230, the wires 234 are removed from the build plate 102. Because the wires 234 are deposited onto the build plate 102 via an electrochemical plating process, and removal of the wires 234 from the build plate 102 without damaging the wires 234 is desired, the wires 234 are removed by a process 270 that maintains the integrity of the wires 234. In some examples, the process 270 includes a selective chemical etching process, a thermal treatment process, and/or a mechanical removal process. After removal of the wires 234, the tool 160, including the build plate 102, can be reused again as a tool or as a more permanent fixture of the electrochemical deposition system 100.

Although the above examples are set forth to facilitate manufacture of a lead-frame package by forming wires on a build plate, it is recognized that the above examples can be applicable to the manufacture of any of various other types of devices that require wires or other electrically-conductive components for operation of the devices.

As shown in FIG. 15, according to some examples, at block 416 of the method 400, the conductive surface 131 of the cathode portion 120 of the build plate 102 is patterned prior to positioning the conductive surface 131 into the electrolyte solution 110. Referring to FIGS. 7A-8B and 10A-14B, in some examples, the conductive surface 131 of the cathode portion 120 is patterned prior to positioning the conductive surface 131 of the cathode portion 120 into the electrolyte solution 110. As used herein, the conductive surface 131 is patterned when a surface of the cathode portion 120 of the build plate 102, configured to be positioned into the electrolyte solution 110 during an electrochemical additive manufacturing process, has multiple distinct areas where at least a first one of the distinct areas (e.g., areas 187) has material deposition characteristics that are different than the material deposition characteristics of at least a second one of the distinct areas (e.g., areas 189). As used herein, material deposition characteristics are characteristics of a material that affect the ability of a metallic material to be deposited onto the material via an electrochemical deposition process. For example, the composition of a material of the build plate 102, such as being one of a conductive or non-conductive material, affects whether metallic material is capable of being deposited onto the build plate 102 via an electrochemical deposition process. As another example, the elevations of a material, relative to the deposition anodes 111, can affect whether metallic material is capable of being deposited onto the build plate 102. In contrast, one example of a build plate 102 that is not patterned is a build plate where the conductive surface is defined exclusively by the flat planar surface of a base block of the build plate.

One example of a cathode portion 120, of a build plate 102, having a conductive surface 131 that is patterned prior to deposition of material onto the cathode portion 120 is shown in FIGS. 10A and 10B. The build plate 102 includes a base 261 made of a conductive material (e.g., a conductive base or a conductive layer on a non-conductive base). The base 261 defines a deposition surface 260, which is made of a conductive material. The build plate 102 further includes a photomask layer 262 applied onto only a portion of the deposition surface 260. The photomask layer 262 is made of a non-conductive, photomasking material, which can be patterned through techniques, such as, but not limited to, photolithography, stereolithography, inkjet deposition, imprint-based lithography, etc. Accordingly, the photomask layer 262 covers a portion of the deposition surface 260 and does not cover another portion of the deposition surface 260. The portion of the deposition surface 260 covered by the photomask layer 262 is defined as a covered portion 264. In contrast, the portion of the deposition surface 260 that is not covered by the photomask layer 162 is defined as an uncovered portion 266. Moreover, the uncovered portion 266 of the deposition surface 260 defines the conductive surface 131 of the cathode portion 120 of the build plate 102. Accordingly, although the entire base 261 can be considered the cathode portion 120 of the build plate 102, only the surface of the base 261 that is uncovered is considered the conductive surface 131 of the cathode portion 120. In this manner, the photomask layer 262, being patterned, helps to pattern the conductive surface 131 of the cathode portion 120. Additionally, with the photomask layer 162 in place, the build plate 102 has a surface that includes first distinct areas 187, defined by the conductive surfaces 131, and second distinct areas 189, defined by the surfaces of the photomask layer 162.

Referring to FIG. 10B, when electrical current flows through the deposition anode array 113 and the electrolyte solution 110, the material 130 is deposited onto only the uncovered portion 266 of the deposition surface 260 (i.e., the first distinct areas 187), because the uncovered portion 266 is an exposed conductive surface, and the material 130 is not deposited onto the covered portion 264 of the deposition surface 260 (corresponding with the second distinct areas 189), because the covered portion 264 is not exposed to the electrolyte solution 110. The material 130 can be added layer by layer to form a conductive feature on the build plate 102. In one example, as shown in FIG. 10B, the conductive feature is a pillar, via, or thin-walled structure having a high aspect ratio. A conductive feature having a high aspect ratio is a conductive feature that has a height H1 that is much greater than a width W1 (which can be a thickness) of the conductive feature. According to some examples, the height H1 is at least two times the width W1. However, in other examples, the height H1 is at least three times the width W1.

The use of the photomask layer 162 to help pattern the conductive surfaces 131 also facilitates the efficient deposition of the material 130 at a footing of the material such that conductive features with high aspect ratio can be formed without additional layers or a thicker layer of photomask. The photomask layer 162 not only defines the conductive surface 131 onto which the material 130 is deposited, but it also insulates the deposition surface 260 that adjoins the conductive surface 131 from secondary current. Accordingly, the material 130 forming a footing of the conductive feature on the conductive surface 131 is confined to the conductive surface 132 by the photomask layer 162. In this manner, excess material is prevented from being deposited around the footing of the conductive feature. After the footing is formed, additional layers of the material 130 can be deposited onto the footing to complete the conductive features. Therefore, a thickness T1 of the photomask layer 162 can be much less than the height H1 of the conductive feature. After the footing is formed or, alternatively, after the conductive feature is fully formed, the photomask layer 162 can be chemically removed prior to use of the build plate 102 as a finished product 200.

Another example of a cathode portion 120, of a build plate 102, having a conductive surface 131 that is patterned prior to deposition of material onto the build plate 102 is shown in FIGS. 11A and 11B. The build plate 102 includes the non-conductive substrate 300 made of a non-conductive material. The build plate 102 also includes the conductive layer 302, which defines the conductive surface 131 of the cathode portion 120. Accordingly, the build plate 102 has a surface that includes first distinct areas 187, defined by the conductive surfaces 131 of the conductive layer 302, and second distinct areas 189, defined by the surface of the non-conductive substrate 300. The conductive layer 302 can be applied onto the non-conductive substrate 300, prior to deposition of the material 130 onto the conductive layer 302, according to any of various patterns. Generally, the patterns are associated with a pattern of an electrical circuit to be formed. In this manner, the conductive surface 131 of the cathode portion 120 of the build plate 102 of FIGS. 11A and 11B is patterned prior to the deposition of the material 130. Referring to FIG. 11B, when electrical current flows through the deposition anode array 113 and the electrolyte solution 110, the material 130 is deposited onto only the conductive layer 302 and not onto the surface of the non-conductive substrate 300

Figure 12:
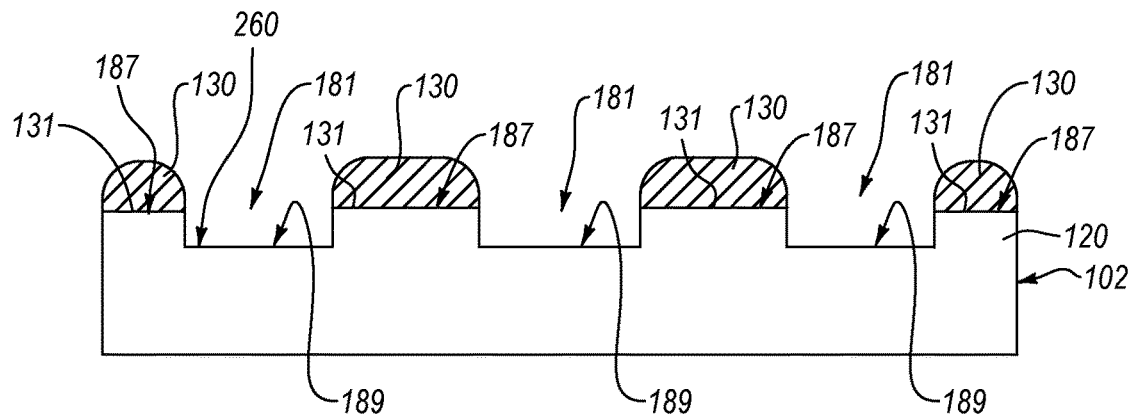
FIG. 12 is a schematic, side elevation view of a cathode portion of a build plate and material deposited on the cathode portion using the system of FIG. 1, according to one or more examples of the present disclosure.

Another example of cathode portion 120, of a build plate 102, having a conductive surface 131 that is patterned prior to deposition of material onto the build plate 102 is shown in FIG. 12. The build plate 102 is made of a conductive material and defines a deposition surface 260 made of the conductive material. The deposition surface 260 is not flat. Rather, the deposition surface 260 includes at least one depression 181. Portions of the deposition surface 260 bounding (e.g., circumscribing) the depressions 181 form the conductive surface 131 of the build plate 102 of the build plate 102. The depressions 181 are size, shaped, and arranged relative to each other to create a conductive surface 131 that is patterned. The depressions 181 are formed in the deposition surface 260 using an etching process to form etched depressions, in one example, and/or a milling process to form milled depressions.

The ability of the material 130 to be deposited onto a surface of the build plate 102 is at least partially dependent on the distance of the surface away from the deposition anode array 113. For example, if the distance is too far, the electrical current from the deposition anode array 113 and passing through the electrolyte solution 110 will not be sufficient to deposit the material 130 onto the surface. Accordingly, a distance a surface is away from the deposition anode array 113 is considered a material deposition characteristic of that surface. As shown in FIG. 12, because the surfaces of the depressions 181 are further away from the deposition anode array 113 than the conductive surface 131 bounding the depressions 181, the material 130 will only be deposited on the conductive surface 131 and will not be deposited on the surfaces of the depressions 181. According to the method 400, the build plate 102 can be positioned relative to the deposition anode array 113 such that the build plate 102 has a surface that includes first distinct areas 187, defined by the conductive surfaces 131 of the conductive layer 302, and second distinct areas 189, defined by the surfaces of the depressions 181. Because the depressions 181 can be formed into the deposition surface 260 according to any of various patterns, the corresponding conductive surface 131 defined between adjacent ones of the depressions 181 can also have any of various patterns. In this manner, conductive surface 131 can be patterned prior to deposition of the material 130 onto the conductive surface 131.

Figure 13A:
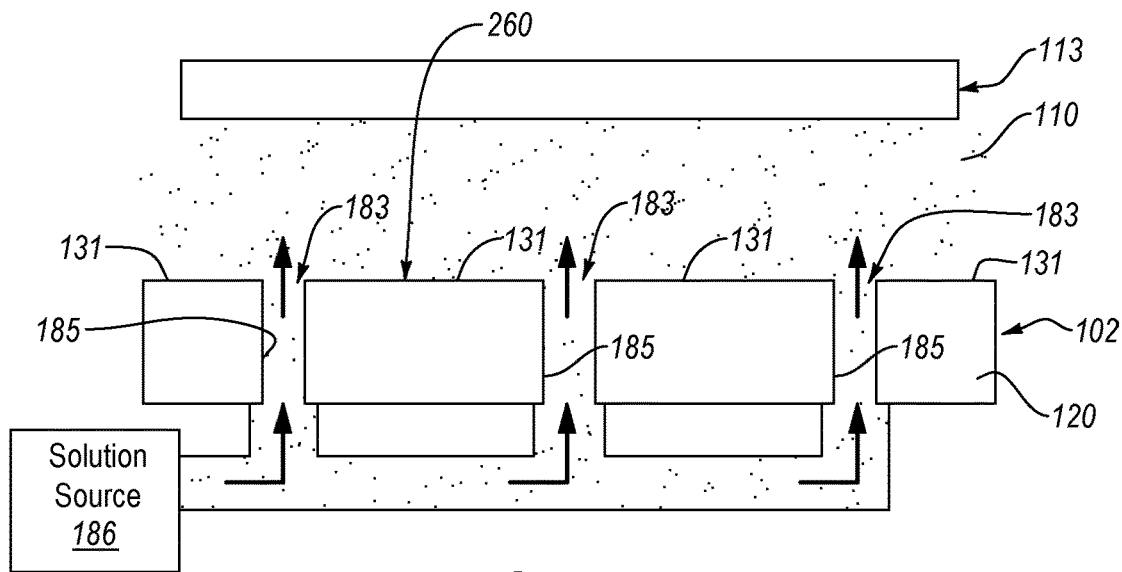
FIG. 13A is a schematic, side elevation view of a deposition anode array and a cathode portion of a build plate, having channels, of the system of FIG. 1, according to one or more examples of the present disclosure.
Figure 13B:
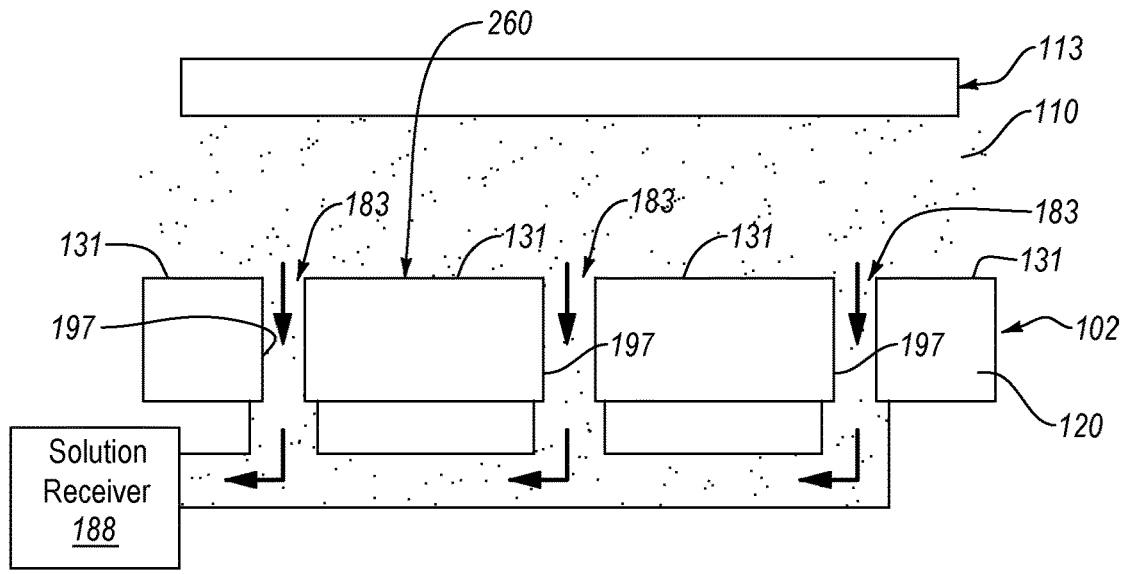
FIG. 13B is a schematic, side elevation view of a deposition anode array and a cathode portion of a build plate, having channels, of the system of FIG. 1, according to one or more examples of the present disclosure.

Another example of a cathode portion 120, of a build plate 102, having a conductive surface 131 that is patterned prior to deposition of material onto the build plate 102 is shown in FIGS. 13A and 13B. The build plate 102 is made of a conductive material and defines a deposition surface 260 made of the conductive material. The build plate 102 includes at least one channel 183 passing entirely through a thickness of the build plate 102. In some examples, the build plate 102 includes multiple, spaced apart, channels 183. Each one of the channels 183 extends from the deposition surface 260 to a surface of the build plate 102 that is opposite the deposition surface 260. Accordingly, the channel 183 is open at the deposition surface 260. Because the channel 183 is open at the deposition surface 260, the channel 183 defines an area of the deposition surface 260 that is not capable of receiving the material 130. Correspondingly, the portions of the deposition surface 260 bounding (e.g., circumscribing) the channel 183 form the conductive surface 131 of the cathode portion 120 of the build plate 102, which is capable of having the material 130 deposited thereon. According to the method 400, the build plate 102 can be positioned relative to the deposition anode array 113 such that the build plate 102 has a surface that includes first distinct areas 187, defined by the conductive surfaces 131 of the conductive layer 302, and second distinct areas 189, defined by the channels 183.

According to some examples, each one of the channels 183 can be one of an electrolyte solution inlet 185 (see, e.g., FIG. 13A) or an electrolyte solution outlet 197 (see, e.g., FIG. 13B). The electrolyte solution inlet 185 is fluidically coupled with an electrolyte solution source 186 of the electrochemical deposition system 100. Electrolyte solution 110 can be supplied into the space between the build plate 102 and the deposition anode array 113 (e.g., into a partially enclosed container that at least partially houses the build plate 102 and the deposition anode array 113). In this manner, electrolyte solution 110 can be supplied from locations other than from around an outer periphery of the build plate 102. The electrolyte solution outlet 197 is fluidically coupled with an electrolyte solution receiver 188 of the electrochemical deposition system 100. Electrolyte solution 110 can be removed from the space between the build plate 102 and the deposition anode array 113 (e.g., out of a partially enclosed container that at least partially houses the build plate 102 and the deposition anode array 113). In this manner, electrolyte solution 110 can be removed from locations other than from around an outer periphery of the build plate 102. In certain examples, the build plate 102 includes one or more electrolyte solution inlets 185 or one or more electrolyte solution outlets 197. However, in certain examples, the build plate 102 includes both one or more electrolyte solution inlets 185 and one or more electrolyte solution outlets 197 that are separate from each other. But, in other examples, one channel 183 can be selectively operable to function as both an electrolyte solution inlet, in one mode, and an electrolyte solution outlet, in another mode, via selective operation of a fluidic valve. Also, in some examples, the electrolyte solution source 186 and the electrolyte solution receiver 188 are the same feature.

For a build plate 102 that has a cathode portion 120 with a conductive surface 131 that is patterned prior to prior to deposition of material onto the build plate 102, the processor 122 of the electrochemical deposition system 100 can include a position-registration module. The position-registration module is configured to register the position of the conductive surface 131 (e.g., material deposition targets on the conductive surface 131), relative to the build plate 102 and relative to the deposition anodes 111 of the deposition anode array 113. Registration of the position of the conductive surface 131 can be performed in advance of the manufacturing of the build plate 102 based on models and predictions. Additionally, or alternatively, registration of the position of the conductive surface 131 can be performed after the manufacturing of the build plate 102 based on scanning and/or measuring the build plate 102.

Figure 14:
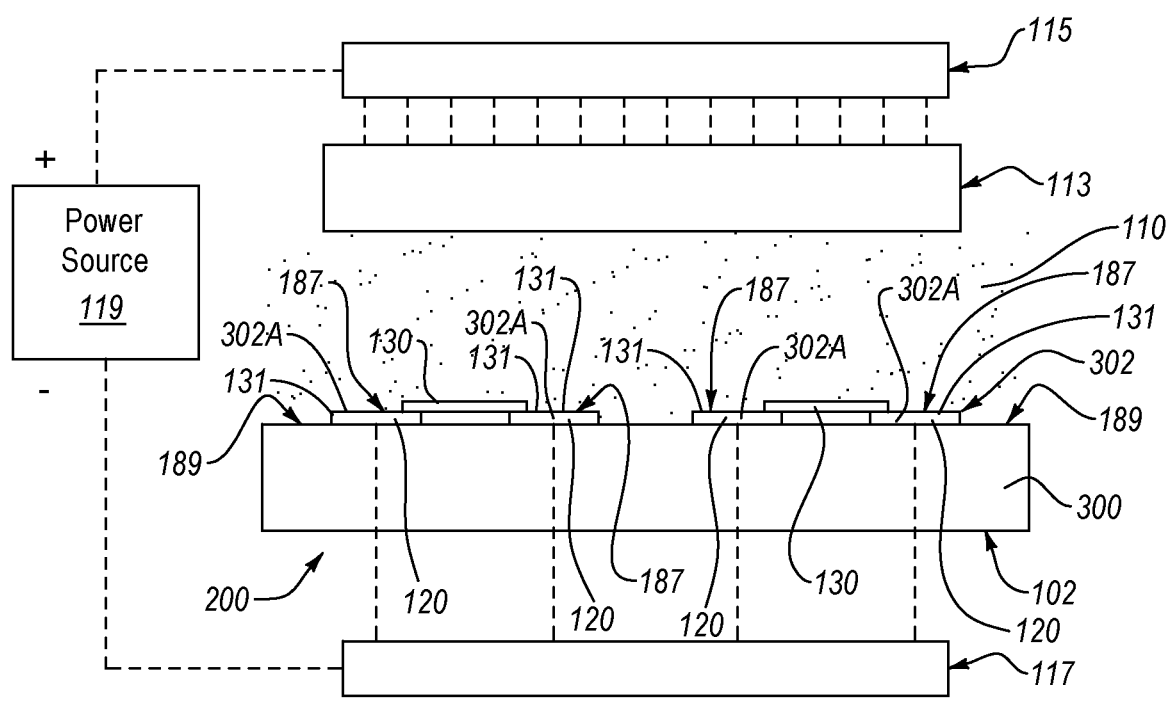
FIG. 14 is a schematic, side elevation view of an electrochemical deposition system, according to one or more examples of the present disclosure.

Referring now to FIG. 14, according to some examples, transmitting the electrical energy through the deposition anode 111 of block 406 of the method 400, and transmitting the electrical energy from the deposition anode 111 through the electrolyte solution 110, to the conductive surface 131 of the cathode portion 120 of the build plate 102 of block 408 of the method 400, includes selectively connecting the conductive layer 302 of the build plate 102 to the electrical power source 119. With the electrical power source 119 electrically connected to the deposition anode array 113, selectively connecting the conductive layer 302 of the build plate 102 to the electrical power source 119 causes the electrical energy to transmit through the deposition anode 111 and from the deposition anode 111 to the conductive surface 131 of the cathode portion 120. In other words, selectively connecting the conductive layer 302 of the build plate 102 to the electrical power source 119 closes the electrical circuit between the deposition anode array 113 and the conductive layer 302 so that the material 130 can be deposited onto the conductive layer 302. In some examples, where the conductive layer 302 includes multiple conductive-layer segments 302A, which are electrically isolated from each other, the method 400 can include separately and independently selectively connecting each one of the plurality of conductive-layer segments 302A to cause the electrical energy to transmit through corresponding ones of the plurality of deposition anodes 111 and from the corresponding ones of the plurality of deposition anodes 111 to corresponding ones of the plurality of conductive-layer segments 302A such that the material 130 is deposited onto the corresponding ones of the plurality of conductive-layer segments 302A.

Selectively connecting the conductive layer 302 or conductive-layer segments 302A can be facilitated by cathode deposition control circuits 117. The cathode deposition control circuits 117 are electrically connected to a negative terminal of the electrical power source 119 and are selectively operable to electrically connect the negative terminal of the electrical power source 119 to the conductive layer 302 to initiate the flow of electrical current from the deposition anode array 113 to the cathode portion 120 of the build plate 102.

In some example, the positive terminal of the electrical power source 119 is non-selectively electrically connected to the deposition anode array 113, such that the flow of electrical current from the deposition anode array 113 to the cathode portion 120 of the build plate 102 is controlled exclusively by the cathode deposition control circuits 117 and selective electrical connection between the conductive layer 302 and the negative terminal of the electrical power source 119. However, other examples, the positive terminal of the electrical power source 119 is selectively electrically connected to the deposition anode array 113, such as via selective operation of the deposition control circuits 115. In these examples, when both the conductive layer 302 of the build plate 102 and the deposition anode array 113 are selectively connected to the electrical power source 119, the electrical energy is transmitted through one or more of the deposition anodes 111 of the deposition anode array 113 and from the deposition anodes 111 to the conductive layer 302 of the build plate 102.

Figure 16A:
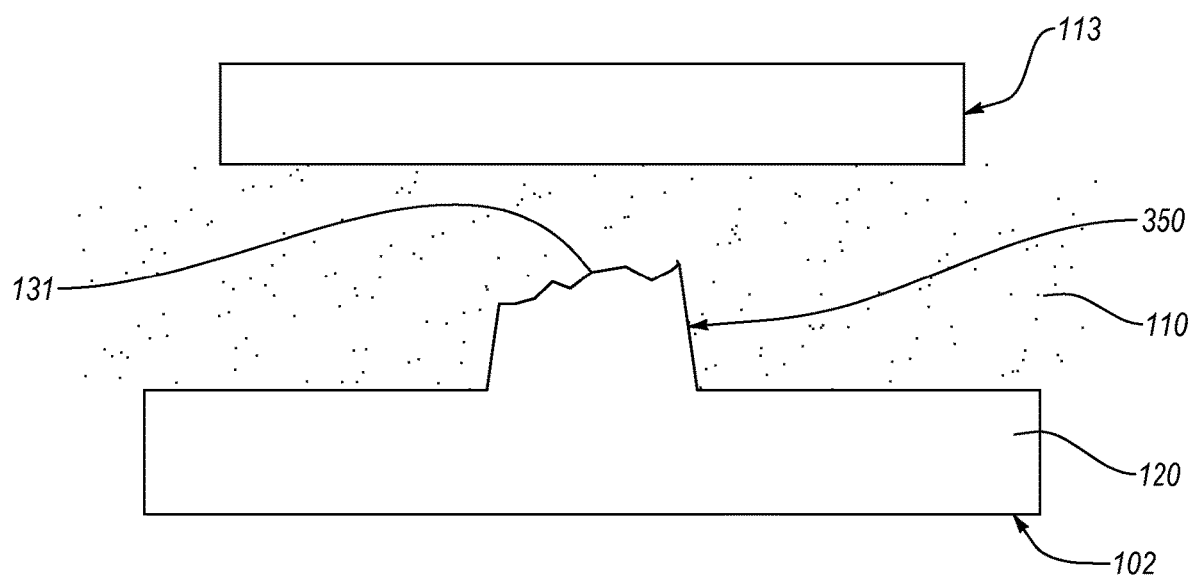
FIG. 16A is a schematic, side elevation view of a deposition anode array and a cathode portion of a build plate of the system of FIG. 1, according to one or more examples of the present disclosure.
Figure 16B:
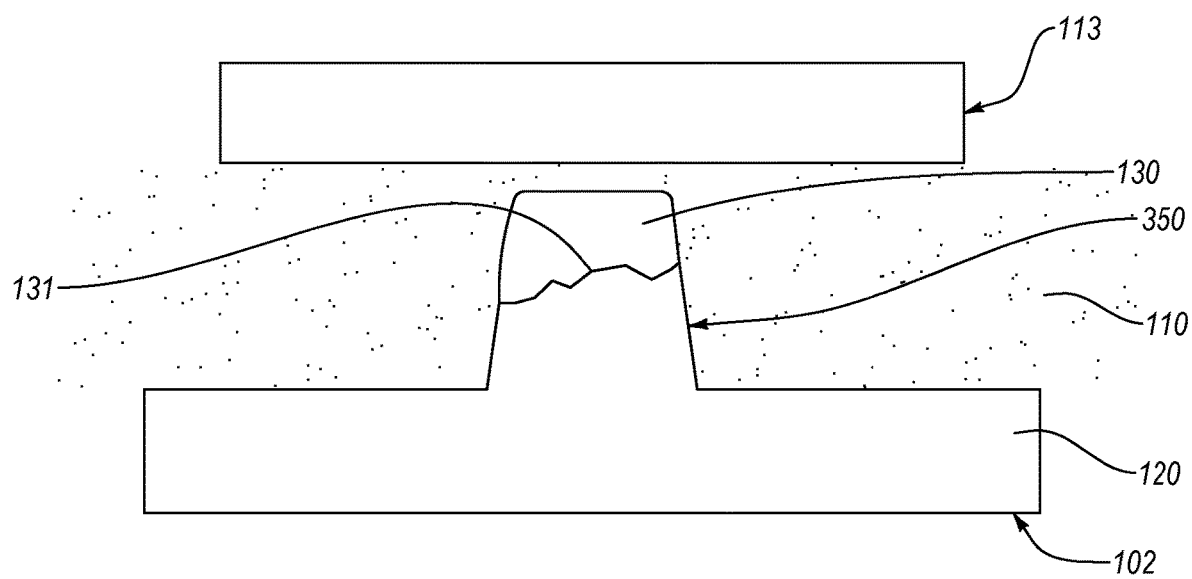
FIG. 16B is a schematic, side elevation view of a deposition anode array and a cathode portion of a build plate of the system of FIG. 1, according to one or more examples of the present disclosure.

Referring to FIGS. 16A and 16B, in some examples, the build plate 102 is a pre-existing or pre-used part, made of a conductive material, that has a worn portion 350 from which material has been worn away or removed during use of the part. In such examples, the worn portion 350 defines the cathode portion 120 and the conductive surface 131. In operation, the material 130 deposited onto the conductive surface 131 replaces the worn or removed material, such that the pre-used part is substantially restored.

Figure 17A:
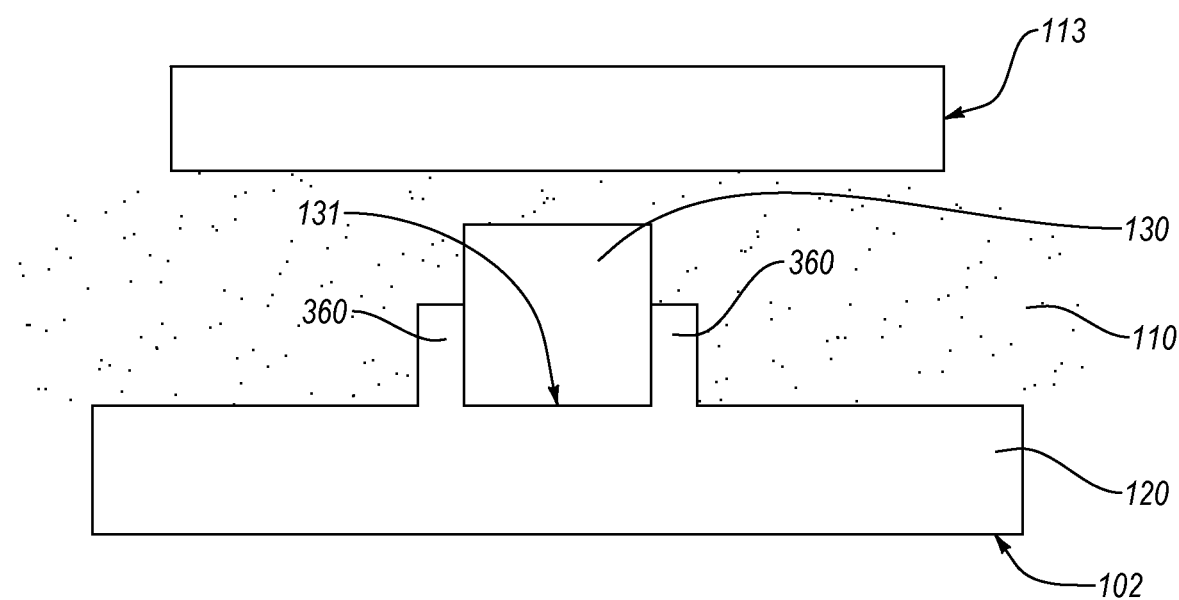
FIG. 17A is a schematic, side elevation view of a deposition anode array and a cathode portion of a build plate of the system of FIG. 1, according to one or more examples of the present disclosure.
Figure 17B:
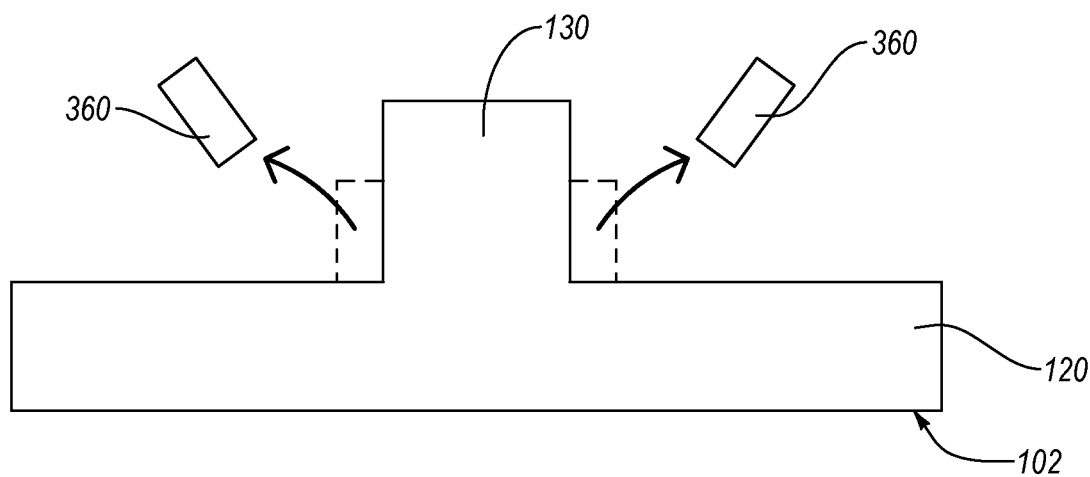
FIG. 17B is a schematic, side elevation view of a material being removed from a build plate of the system of FIG. 1, according to one or more examples of the present disclosure.

Referring to FIGS. 17A and 17B, in some examples, the build plate 102 includes an excess material portion 360. The material 130 is deposited onto the cathode portion 120 of the build plate 102. The material 130 deposited onto the cathode portion 120 can be adjoined to or spaced apart from excess material portion 360. In one example, the excess material portion 360 at least partially supported the material 130 as it is deposited onto the cathode portion 120. After the material 130 is deposited onto the cathode portion 120, the excess material portion 360 can be removed, using any of various removal tools or processes, as shown in FIG. 17B.

Figure 18A:
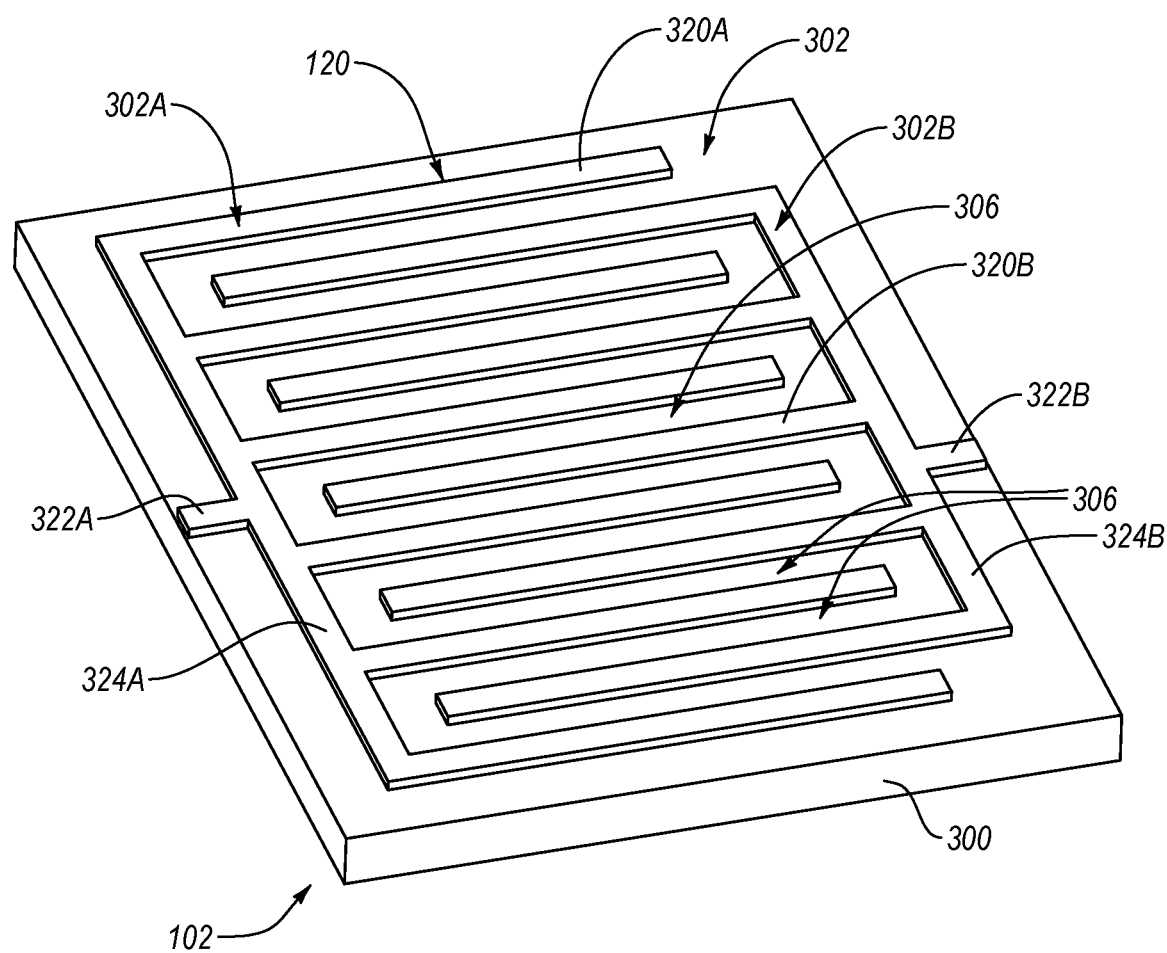
FIG. 18A is a schematic, perspective view of a build plate, having a pre-applied conductive layer, of the system of FIG. 1, according to one or more examples of the present disclosure.

Referring now to FIG. 18A, according to another example, a build plate 102 includes a non-conductive substrate 300 and a conductive layer 302 on the surface of the non-conductive substrate 300. Example build plates include rigid printed circuit boards, flexible printed circuit boards, semiconductor wafers, semiconductor wafer dies, patterned conductive foils, and the like. The conductive layer 302 is applied onto, or formed in, the non-conductive substrate 300 prior to an electrochemical deposition process. More specifically, the conductive layer 302 is patterned according to a predetermined pattern of one or more conductive-layer segments. The pattern of the conductive layer 302 corresponds with a component at least partially formed by the material 130 deposited onto the one or more conductive-layer segments. Accordingly, the pattern of the conductive layer 302 can help define the component (e.g., a pattern of the component). The component forms part of or an entirety of a finished product.

In some examples, the conductive layer 302 includes one conductive-layer segment or multiple conductive-layer segments that are electrically isolated from each other by a dielectric. In FIG. 18A, the conductive layer 302 includes a first conductive-layer segment 302A and a second conductive-layer segment 302B, separated from each other by a dielectric layer 306. In the illustrated example, each one of the first conductive-layer segment 302A and the second conductive-layer segment 302B is a thin layer of conductive material (such as a thin elongated strip of electrically conductive material (e.g., a traditional trace, pad, etc. of a printed circuit board) that defines a predetermined pattern for deposited material. According to certain examples, the predetermined pattern is associated with a particular functionality enabled by the deposited material, when deposited according to the predetermined pattern.

In the example of FIG. 18A, the predetermined pattern corresponds with an interleaved capacitor. The first conductive-layer segment 302A includes multiple first parallel portions 320A interconnected together by a first bridge portion 324A. Similarly, the second conductive-layer segment 302B includes multiple second parallel portions 320B interconnected together by a second bridge portion 324B. Each one of some of the first parallel portions 320A is interposed between two adjacent ones of some of the second parallel portions 320B. Correspondingly, each one of some of the second parallel portions 320B is interposed between two adjacent ones of some of the first parallel portions 320A. The first conductive-layer segment 302A also includes a first terminal portion 322A connected to the first bridge portion 324A and the second conductive-layer segment 302B also includes a second terminal portion 322B connected to the second bridge portion 324B. The parallel portions in the Figures are shown as linear, but other configurations including zig zag, curved, etc. may be used. In certain examples, the predetermined pattern can correspond with any of various types of electrical or non-electrical components. Example mechanical components include parts such as alignment components, mounting components, heat sink components, etc. Example electrical components include capacitors, resistors, antenna elements, etc. Example electromechanical components include connectors, MEMS, etc.

The dielectric layer 306 in the example of FIG. 18A includes the electrically non-conductive material of the non-conductive substrate 300. More specifically, the electrically non-conductive material of the non-conductive substrate 300 extends between the first conductive-layer segment 302A and the second conductive-layer segment 302B, so as to electrically isolate the first conductive-layer segment 302A and the second conductive-layer segment 302B from each other. Additionally, the air (e.g., gas) or vacuum between the first conductive-layer segment 302A and the second conductive-layer segment 302B also acts as a dielectric to electrically isolate the first conductive-layer segment 302A and the second conductive-layer segment 302B from each other.

After the conductive layer 302 is applied onto the non-conductive substrate 300, the conductive layer 302 is submersed in the electrolyte solution 110 and the electrochemical deposition system 100 is operated to deposit a layer of the material 130 onto only the first conductive-layer segment 302A and the second conductive-layer segment 302B. In this manner, the layer of the material 130 deposited onto the first conductive-layer segment 302A and the second conductive-layer segment 302B has the same shape (e.g., pattern) as or a shape similar to the first conductive-layer segment 302A and the second conductive-layer segment 302B. Moreover, because the first conductive-layer segment 302A and the second conductive-layer segment 302B are electrically isolated from each other, the layer of the material 130 applied onto the first conductive-layer segment 302A is electrically isolated from the layer of the material 130 applied onto the second conductive-layer segment 302B. The same process can be followed to electrochemically deposit multiple layers of the material 130 onto each other until a desired thickness T of the material 130 is achieved. In some examples, the desired thickness T corresponds with a desired performance characteristic of a finished product 200 (see, e.g., FIG. 18B).

According to some examples of using the electrochemical deposition system 100 to deposit the material 130 onto one or more conductive-layer segments of the conductive layer 302 of the build plate 102, the build plate 102 is positioned into the electrolyte solution 110 so that the conductive layer 302 directly contacts the electrolyte solution 110. The deposition anode array 113 is also positioned into the electrolyte solution 110 so that the deposition anode array 113 directly contacts the electrolyte solution 110 and so that the gap 133 is established between the one or more conductive-layer segments and the deposition anode array 113. One or more of the conductive-layer segments and one or more of the deposition anodes 111 of the deposition anode array 113 are electrically connected to the power source 119. Then, electrical energy from the power source 119 is transmitted through the one or more of the deposition anodes 111 that corresponds with at least a portion of the pattern formed by the one or more conductive-layer segments, through the electrolyte solution 110, and to the one or more of the conductive-layer segments. The transmission of electrical energy in this manner causes the material 130 to be deposited onto the one or more conductive-layer segments to form at least a portion of a component, which as defined above, can be an electrical, mechanical, or electromechanical component. This process can be repeated to deposit additional layers of the material 130 onto one or more previously deposited layers to increase a thickness of the material 130 on the conductive-layer segments.

In some examples, the first conductive-layer segment 302A and the second conductive-layer segment 302B are temporarily electrically connected when the material 130 is applied, so that the material 130 can be applied synchronously onto the first conductive-layer segment 302A and the second conductive-layer segment 302B. After the material deposition process is complete, the temporary electrical connection between the first conductive-layer segment 302A and the second conductive-layer segment 302B can be removed so that the layer(s) of the material 130 applied onto the first conductive-layer segment 302A are electrically isolated from the layer(s) of the material 130 applied onto the second conductive-layer segment 302B.

In alternative examples, the first conductive-layer segment 302A and the second conductive-layer segment 302B are separately or independently electrically connected to the power source 119. In this manner, electrical power can be supplied to the first conductive-layer segment 302A and the second conductive-layer segment 302B asynchronously so that deposition of the material 130 is applied onto the first conductive-layer segment 302A and the second conductive-layer segment 302B in an asynchronous manner.

According to some examples, the spacing between adjacent conductive-layer segments corresponds with the size of each one of deposition anodes 111 of the deposition anode array 113. For example, the spacing between adjacent conductive-layer segments can be equal to the width of a deposition anode 111. However, as presented above, the electrochemical deposition process of the present disclosure enables the material 130 to be deposited in a lateral direction, to form overhang portions of the material 130. In this manner, spacing between conductive-layer segments can be less a width of a deposition anode 111 by forming one or more overhang portions between the conductive-layer segments.

The deposition anodes 111 of the deposition anode array 113 are selectively activated according to the location of the deposition anodes 111 relative to the conductive-layer segments. For example, only those of the deposition anodes 111 that align with (e.g., are vertically offset from) or form the same predetermined pattern as the conductive-layer segments are activated. In other words, the deposition anodes 111 that are selectively activated form a pattern matching the pattern of the conductive-layer segments. This ensures the material 130 is deposited onto the conductive-layer segments in a precise and efficient manner. In some examples, the predetermined pattern of conductive-layer segments is uploaded to or accessed by the controller 122, which controls activation of the deposition anodes 111 accordingly. However, in certain examples, the predetermined pattern is not uploaded or accessed by the controller 122 prior to depositing the material 130, such as when the predetermined pattern is not known in advance. In these examples, the sensors 123 of the electrochemical deposition system 100 includes one or more sensors that senses the pattern of conductive-layer segments. Then, in response to a sensed pattern of conductive-layer segments received by the one or more sensors, the controller 122 controls activation of the deposition anodes 111.

Figure 18B:
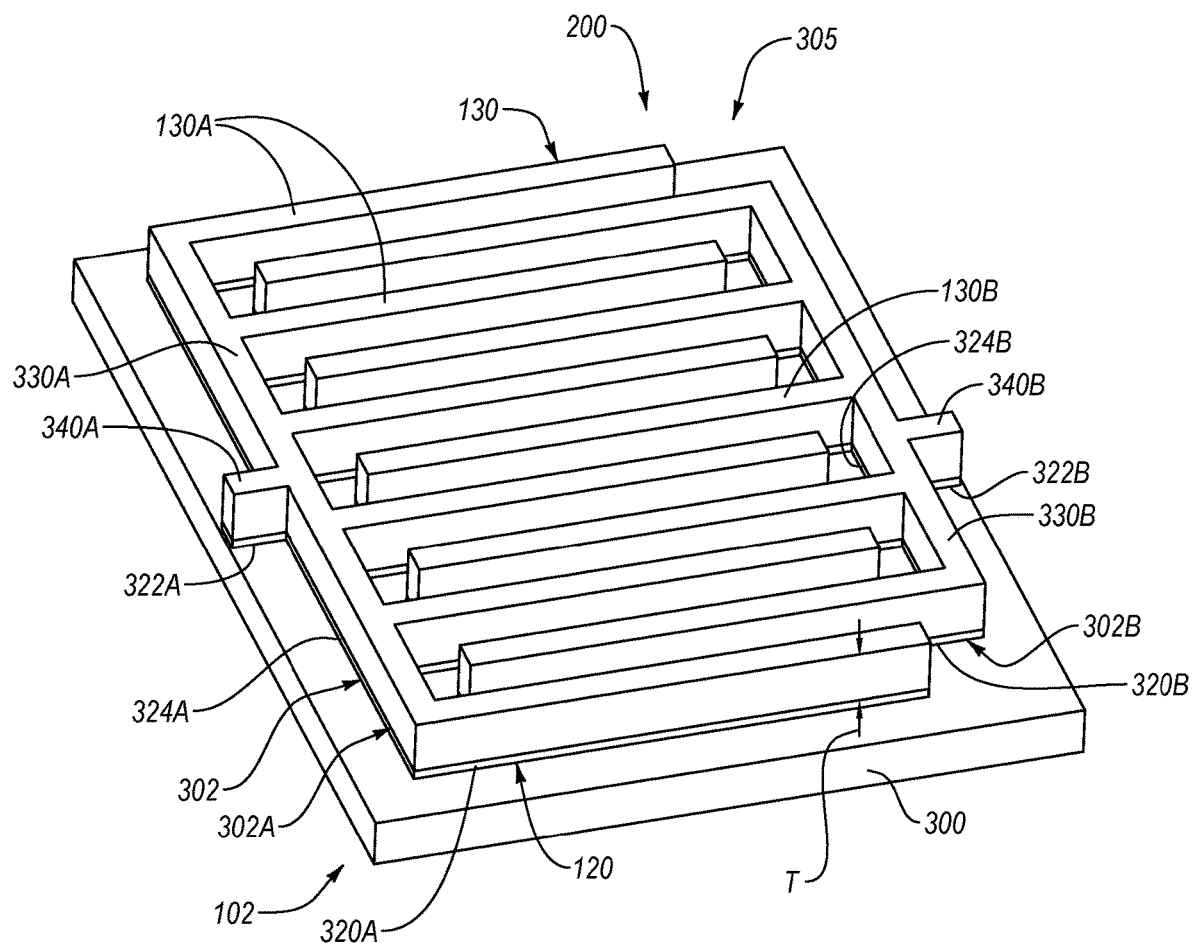
FIG. 18B is a schematic, perspective view of a capacitor, according to one or more examples of the present disclosure.

Referring to FIG. 18B, the finished product 200 is a capacitor 305. In the particular example of FIG. 18B, the capacitor 305 is an interleaved capacitor having multiple interleaved plates. More specifically, the material 130 deposited onto the first parallel portions 320A forms multiple first plates 130A, spaced apart from each other, the material 130 deposited onto the first bridge portion 324A forms a first bridge plate 330A, and the material 130 deposited onto the first terminal portion 322A forms a first terminal 340A of the capacitor 305. Similarly, the material 130 deposited onto the second parallel portions 320B forms multiple second plates 130B, spaced apart from each other, the material 130 deposited onto the second bridge portion 324B forms a second bridge plate 330B, and the material 130 deposited onto the second terminal portion 322B forms a second terminal 340B of the capacitor 305. The first bridge plate 330A and the second bridge plate 330B can help to stiffen the first plates 130A and the second plates 130B, respectively. In alternative examples, the electrochemical deposition process can be controlled so that no material, or a limited quantity of material, is deposited onto the first bridge portion 324A, the first terminal portion 322A, the second bridge portion 324B, and/or the second terminal portion 322B.

Each one of some of the first plates 130A is interposed between two adjacent ones of some of the second plates 130B. Correspondingly, each one of some of the second plates 130B is interposed between two adjacent ones of some of the first plates 130A. Each one of the first plates 130A effectively forms a capacitor with a corresponding one of the second plates 130B. Accordingly, the capacitor 305 illustrated in FIG. 18B, in effect, includes eight capacitors. The capacitance of each one of the capacitors, and thus the overall capacitance of the capacitor 305, depends on the thickness T of the interleaved plates and thus number of layers of the material 130 electrochemically deposited onto the conductive-layer segments. In some examples, controller 122 deposits the material 130 so that the thickness T corresponds with a predetermined thickness associated with a desired capacitance. However, in other examples, the sensors 123 include a capacitance meter, which is electrically coupled with the first plates 130A and the second plates 130B and measures the capacitance of the capacitor 305 as the capacitor 305 is formed. In such examples, the controller 122 can be configured to continue to deposit layers of the material 130 until a desired capacitance (e.g., predetermined threshold), as sensed by the capacitance meter, is reached.

In some examples, the controller 122 is configured to modulate the deposit of material onto the first parallel portions 320A and/or the second parallel portions 320B so that the thickness T of the first plates 130A and/or the second plates 130B, and thus the capacitance of corresponding capacitors, are different. For example, first ones of the first plates 130A and second plates 130B can have a thickness different than second ones of the first plates 130A and the second plates 130B so that the capacitance of the capacitor formed by the first ones of the first plates 130A and the second plates 130B is different than the capacitance of the capacitor formed by the second ones of the first plates 130A and the second plates 130B. The thickness of a plate can be changed by adjusting the thickness of one or more layers, and/or changing the quantity of layers forming the plate.

Figure 19:
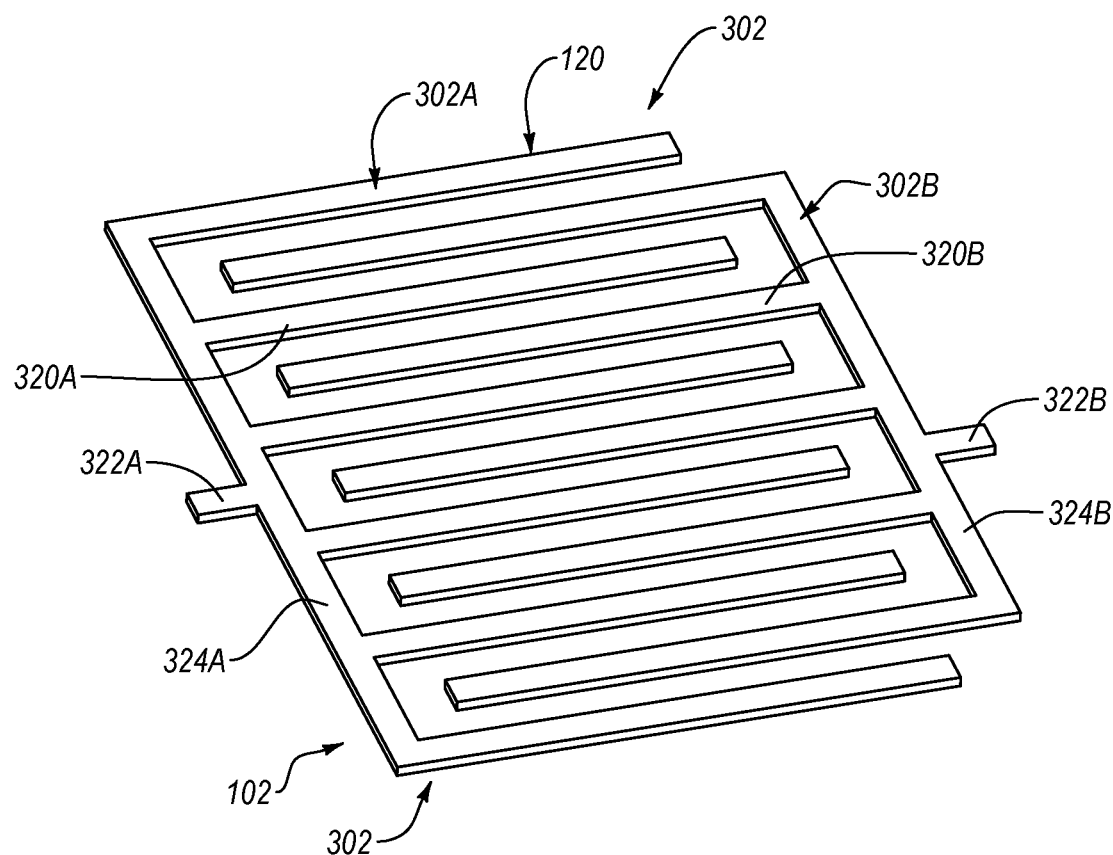
FIG. 19 is a schematic, perspective view of a build plate, according to one or more examples of the present disclosure.

Referring now to FIG. 19, according to another example, the build plate 102 includes a conductive layer 302, but does not include a non-conductive substrate 300. In some examples, the conductive layer 302 is a thin sheet or foil that is patterned according to a predetermined pattern of one or more conductive-layer segments. The conductive layer 302 can be rigid, so that conductive layer 302 is self-supporting. However, in some examples, the conductive layer 302 can be placed on and supported by a support plate during an electrochemical deposition process. In some examples, the conductive layer 302 includes multiple conductive-layer segments that are electrically isolated from each other by a dielectric. In FIG. 19, similar to the conductive layer 302 of FIG. 18A, the conductive layer 302 includes a first conductive-layer segment 302A and a second conductive-layer segment 302B, separated from each other by a dielectric layer 306. According to certain examples, the predetermined pattern of the conductive layer 302 is associated with a particular functionality enabled by the deposited material, when deposited according to the predetermined pattern. Like the example of FIG. 18A, in the example of FIG. 19, the predetermined pattern corresponds with an interleaved capacitor. However, in other examples, the predetermined pattern can correspond with any of various types of electrical or non-electrical components.

Unlike the example of FIG. 18A, the build plate 102 of FIG. 19 does not include a solid non-conductive substrate or a dielectric layer. Rather, in FIG. 19, a gap (e.g., air, gas, vacuum, etc.) between the first conductive-layer segment 302A and the second conductive-layer segment 302B acts as a dielectric that electrically isolates the first conductive-layer segment 302A from the second conductive-layer segment 302B. More specifically, the gap provides sufficient electrical isolation between the first conductive-layer segment 302A and the second conductive-layer segment 302B so that the material 130 can be deposited onto the first conductive-layer segment 302A and the second conductive-layer segment 302B in the same manner as described above with regards to FIGS. 18A and 18B.

In some examples, the conductive layer 302 can be patterned, to create conductive-layer segments having patterns similar to those described herein, by utilizing a patterned mask. The patterned mask can be applied onto an electrically conductive base, which acts as the conductive layer 302 of the build plate 102. Moreover, the patterned mask includes through-apertures patterned according to a desired pattern of conductive-layer segments. The patterned mask is made of an electrically non-conductive material so that when electrical energy is transmitted through the deposition anode array 113, through the electrolyte solution 110, and to the conductive layer 302, the material 130 is electrochemically deposited onto only the portions of the conductive layer 302 exposed by the through-apertures. In this manner, the material 130 deposited onto the conductive layer 302 forms a pattern corresponding with the pattern defined by the through-apertures.

Figure 20A:
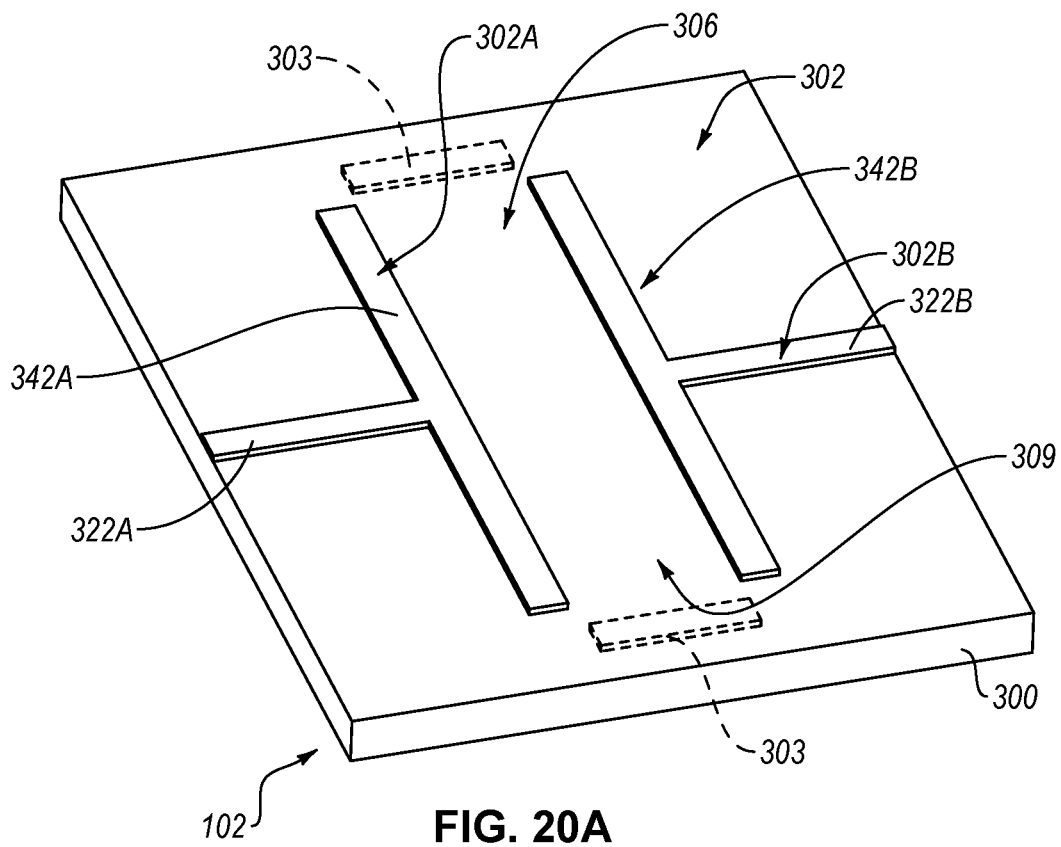
FIG. 20A is a schematic, perspective view of a build plate, having a pre-applied conductive layer, of the system of FIG. 1, according to one or more examples of the present disclosure.

Referring to FIG. 20A, according to another example, a build plate 102 includes a non-conductive substrate 300 and a conductive layer 302 on the surface of the non-conductive substrate 300. The build plate 102 of FIG. 20A, which includes a first conductive-layer segment 302A and a second conductive-layer segment 302B is similar to the build plate 102 of FIG. 18A. For example, each one of the first conductive-layer segment 302A and the second conductive-layer segment 302B defines a predetermined pattern for deposited material that is associated with a particular functionality enabled by the deposited material. However, instead of an interleaved capacitor, in the example of FIG. 20A, the predetermined pattern corresponds with a resistor. Accordingly, the first conductive-layer segment 302A includes a first wall portion 342A that is parallel to and spaced apart from a second wall portion 342B of the second conductive-layer segment 302B, so that a gap 309 (e.g., well) is defined between the first wall portion 342A and the second wall portion 342B. Additionally, the first conductive-layer segment 302A includes a first terminal portion 322A connected to the first wall portion 342A, and the second conductive-layer segment 302B includes a second terminal portion 322B connected to the second wall portion 342B.

Figure 20B:
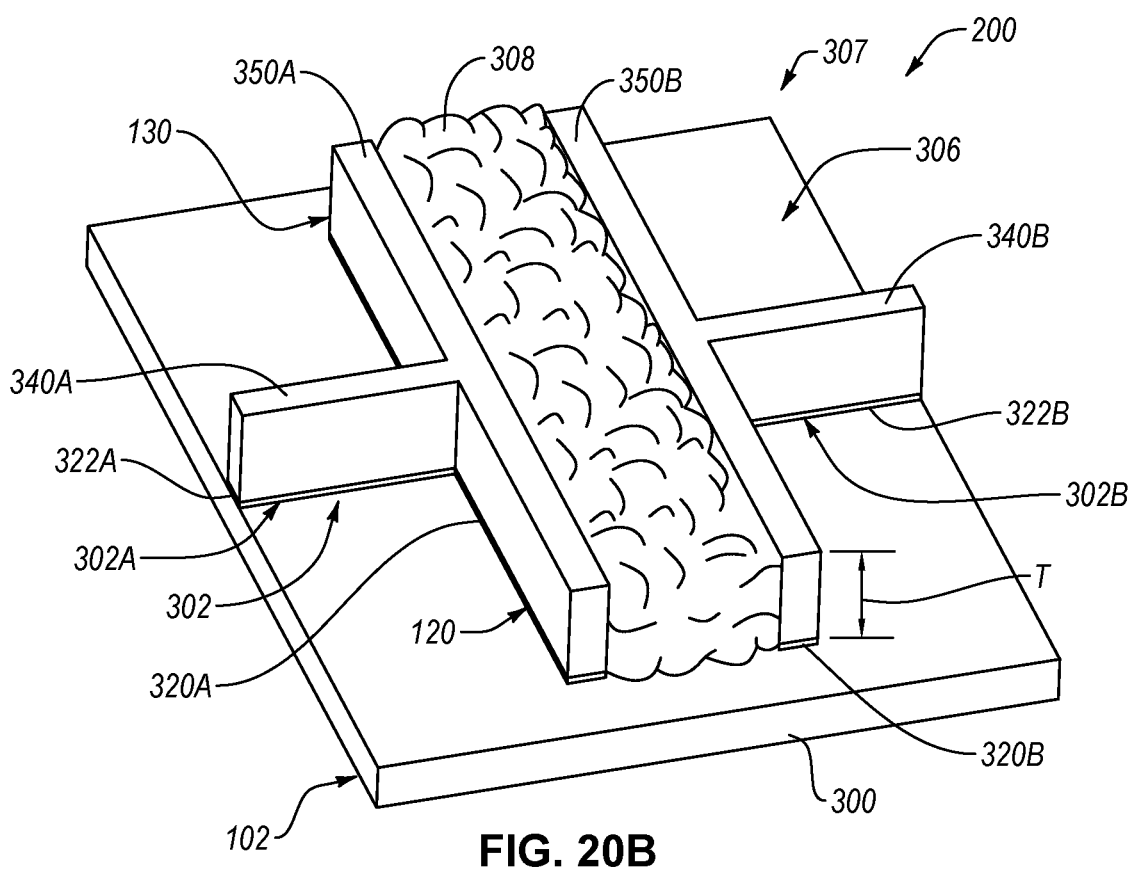
FIG. 20B is a schematic, perspective view of a resistor, according to one or more examples of the present disclosure.

Similar to the process described above in relation to FIG. 18B, layers of the material 130 are electrochemically deposited onto the conductive-layer segments of FIG. 20A until a desired thickness T of the material 130 is achieved. Referring to FIG. 20B, the finished product 200 is a resistor 307. More specifically, the material 130 deposited onto the first wall portion 342A forms a first wall 350A and the material 130 deposited onto the second wall portion 342B forms a second wall 350B, spaced apart from each other by the gap 309. Additionally, the material 130 deposited onto the first terminal portion 322A forms a first terminal 340A and the material 130 deposited onto the second terminal portion 322B forms a second terminal 340B, spaced apart from each other by the gap 309. After the first wall 350A and the second wall 350B are formed, an electrically resistive material 308 is deposited into the gap 309 defined between the first wall 350A and the second wall 350B. In this manner, the first wall 350A and the second wall 350B act as containment walls for containing the electrically resistive material 308 therebetween. The resistance of the resistor 307 depends on the electrical resistivity of the electrically resistive material 308 and the thickness of the electrically resistive material 308, which can be a function of the desired thickness T.

Alternatively, as shown in FIG. 20A, in some examples, the predetermined pattern of the conductive layer 302 includes a pair of third conductive-layer segments 303. Each one of the third conductive-layer segments 303 is proximate and electrically isolated from corresponding ends of the first conductive-layer segment 302A and the second conductive-layer segment 302B. More specifically, each one of the third conductive-layer segments 303 extends across a portion of the gap 309, within the gap 309 or, as shown, adjacent to the gap 309. When the material 130 is electrochemically deposited onto the third conductive-layer segments 303, corresponding walls are formed, which can help contain the electrically resistive material 308 within the gap 309. In other words, the first wall 350A and the second wall 350B help to contain the electrically resistive material 308 along sides of the gap 309 and the walls formed on the third conductive-layer segments 303 help contain the electrically resistive material 308 along the ends of the gap 309.

Figure 21:
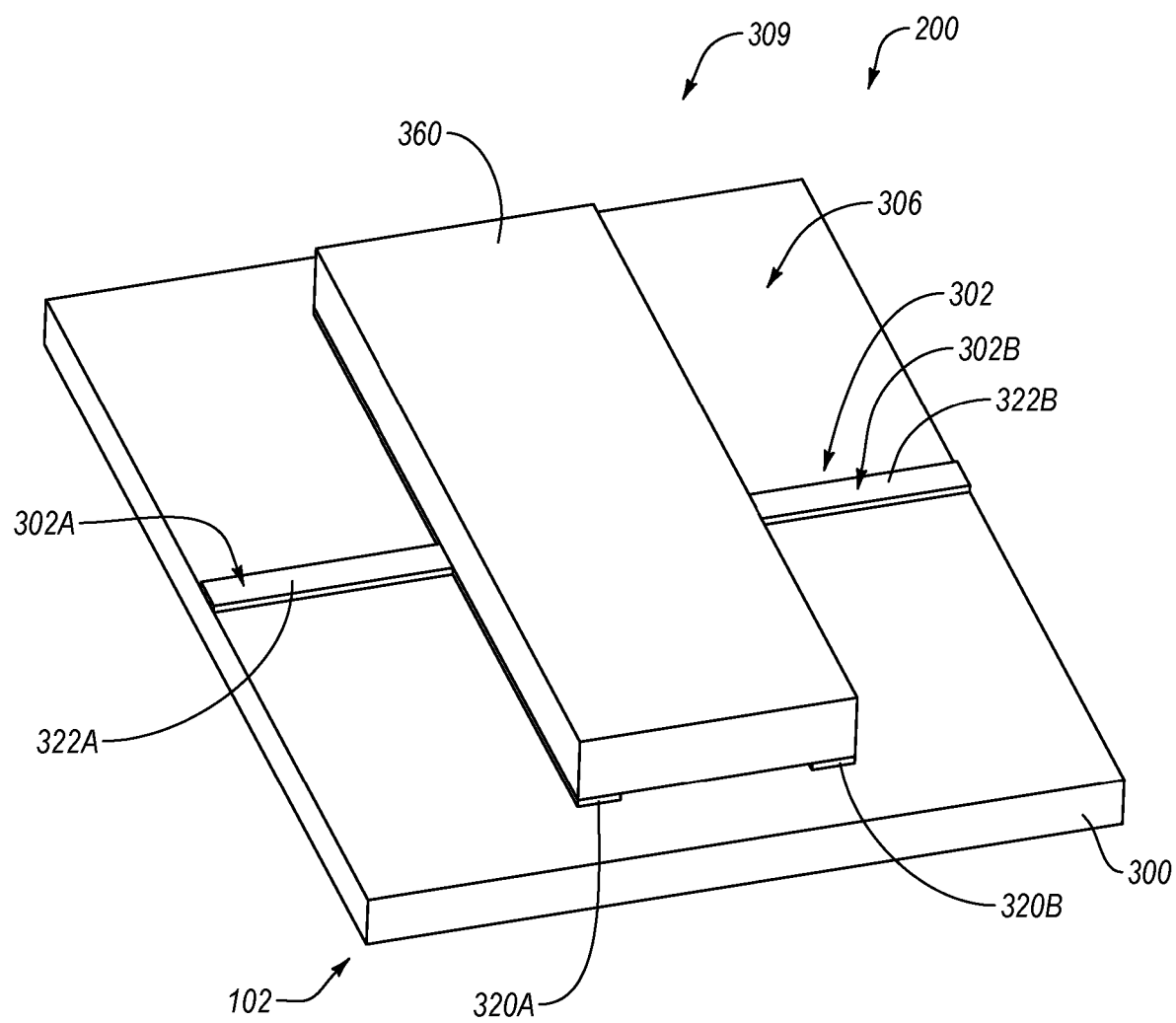
FIG. 21 is a schematic, perspective view of a resistor, according to one or more examples of the present disclosure.

Referring to FIG. 21, according to other examples, the finished product 200 is a resistor 309. Like the resistor 307 of FIG. 20B, in certain examples, the resistor 309 can be formed from a build plate similar to the build plate 102 of FIG. 20A. However, instead of depositing electrically resistive material 308 between opposing walls made of the material 130 to create the electrical resistivity of the resistor, as with the resistor 307, the electrical resistivity of the resistor 309 is created by electrochemically depositing a material 360, which has an electrical resistance corresponding with a desired electrical resistance of the resistor 309, between the first terminal portion 322A and the second terminal portion 322B. In some examples, the material 130 is not deposited onto the first terminal portion 322A and the second terminal portion 322B, such that the deposited material does not form a first terminal 340A or a second terminal 340B. In some examples, the material 360 is deposited onto the first wall portion 342A and the second wall portion 342B of the first conductive-layer segment 302A and the second conductive-layer segment 302B, respectively. Additional portions of the material 360 are then deposited as overhang portions until the material 360 deposited on the first wall portion 342A is electrically connected to the material 360 deposited on the second wall portion 342B.

In one example, the resistivity of the material 360 is controlled by selecting an electrolyte solution that results in charged metal ions, in the electrolyte solution and having a particular electrical resistivity (e.g., a particular limited conductivity), being deposited onto the build plate 102. Alternatively, in the same or other examples, the resistivity of the material 360 is controlled by controlling the density of the material 360 deposited onto the build plate 102. The density of the material 360 can be controlled by controlling the characteristics (e.g., timing, intensity, etc.) of the activation of the deposition anodes 111. According to some examples, the sensors 123 include a resistance meter, which is electrically coupled with the first terminal 340A and the second terminal 340B. The resistance meter measures the resistance of the resistor 309 as the resistor 309 is formed. In such examples, the controller 122 can be configured to continue to deposit layers of the material 360 until a desired resistance, as sensed by the resistance meter, is reached.

The electrochemical deposition system 100 and associated method of using the system to make a finished product can help simplify the fabrication of a finished product that includes an electrically-conductive base with one or more electrically-conductive elements on the electrically-conductive base, where the electrically-conductive base is substantially larger than the one or more electrically-conductive elements. According to conventional methods, the electrically-conductive base is electrochemically deposited onto a conductive surface and then the one or more electrically-conductive elements are electrochemically deposited onto the base. To simplify the process, the electrically-conductive base can be formed in a separate process, other than an electrochemical deposition process, and supplied to the electrochemical deposition system 100 as the build plate 102. The electrochemical deposition system 100 then electrochemically deposits material onto the separately and previously formed electrically-conductive base.

It is also recognized that the fabrication of the finished products 200 using the electrochemical deposition system 100 can incorporate one or more additional components to form a resulting circuit. The resulting circuit can be tested after the finished product is completed or while the finished product is being fabricated.

Other features and steps of the electrochemical deposition system 100 and the method 400, respectively, can be found in U.S. patent application Ser. No. 17/112,909, filed December 2020, which is incorporated herein by reference in its entirety.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the examples may be combined in any suitable manner. In the above description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various examples. In this regard, each block in the schematic flowchart diagrams and/or schematic block diagrams may represent a module, segment, or portion of code, which comprises one or more executable instructions of the code for implementing the specified logical function(s).

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An electrochemical additive manufacturing method, comprising steps of:
positioning a first build plate into an electrolyte solution such that a conductive surface of a cathode portion of the first build plate directly contacts the electrolyte solution;
positioning a deposition anode array, comprising a plurality of deposition anodes, into the electrolyte solution such that a gap is established between the conductive surface of the cathode portion and the deposition anode array;
connecting the cathode portion to a power source;
connecting one or more deposition anodes of the plurality of deposition anodes to the power source;
transmitting electrical energy from the power source through the one or more deposition anodes of the plurality of deposition anodes, through the electrolyte solution, and to the conductive surface of the cathode portion, such that material is deposited onto the conductive surface of the cathode portion forms at least a portion of a component, wherein:
the first build plate comprises a thermal feature configured to transfer heat;
the material deposited onto the conductive surface is thermally coupled with the thermal feature to promote heat transfer by or to the thermal feature; and
the material deposited onto the conductive surface forms a heat wicking feature;
positioning a second build plate into the electrolyte solution such that a conductive surface of a cathode portion of the second build plate directly contacts the electrolyte solution;
positioning the deposition anode array into the electrolyte solution such that a gap is established between the conductive surface of the cathode portion of the second build plate and the deposition anode array;
connecting the cathode portion of the second build plate to the power source;
transmitting electrical energy from the power source through the one or more deposition anodes of the plurality of deposition anodes, through the electrolyte solution, and to the conductive surface of the cathode portion of the second build plate, such that material is deposited onto the conductive surface of the cathode portion of the second build plate forms at least a portion of a second component, wherein:
the second build plate comprises a second thermal feature configured to transfer heat;
the material deposited onto the conductive surface of the cathode portion of the second build plate is thermally coupled with the second thermal feature to promote heat transfer by or to the second thermal feature; and
the material deposited onto the conductive surface of the cathode portion of the second build plate forms a second heat wicking feature; and
coupling together opposing end portions of the first build plate to opposing end portions of the second build plate to define a sealed fluid channel between the first build plate and the second build plate, wherein the heat wicking feature and the second heat wicking feature are located within the sealed fluid channel.

2. The electrochemical additive manufacturing method according to claim 1, wherein at least one of the heat wicking feature and the second heat wicking feature comprises at least one protrusion.

3. The electrochemical additive manufacturing method according to claim 1, wherein:
the heat wicking feature comprises at least one recess;
the second heat wicking feature comprises at least one protrusion; and
the electrochemical additive manufacturing method further comprises nestably inserting the at least one recess into the at least one protrusion.

4. The electrochemical additive manufacturing method according to claim 1, wherein the step of coupling together the opposing end portions of the first build plate to the opposing end portions of the second build plate comprises sealing together opposing free ends of the first build plate to opposing free ends of the second build plate.

5. The electrochemical additive manufacturing method according to claim 1, wherein the thermal feature comprises at least one fin attached to a surface of the cathode portion of the first build plate that is opposite the conductive surface of the cathode portion.

6. The electrochemical additive manufacturing method according to claim 1, wherein:
the component comprises an electronic sensor component; and
the cathode portion and the material deposited onto the conductive surface of the cathode portion form the electronic sensor component.

7. The electrochemical additive manufacturing method according to claim 6, wherein the electronic sensor component comprises a thermocouple.

8. The electrochemical additive manufacturing method according to claim 6, wherein the electronic sensor component comprises a strain gauge.

9. The electrochemical additive manufacturing method according to claim 1, wherein the heat wicking feature is a first lattice and the second heat wicking feature is a second lattice.

10. An electrochemical additive manufacturing method, comprising steps of:
positioning a first build plate into an electrolyte solution such that a conductive surface of a cathode portion of the first build plate directly contacts the electrolyte solution;
positioning a deposition anode array, comprising a plurality of deposition anodes, into the electrolyte solution such that a gap is established between the conductive surface of the cathode portion and the deposition anode array;
connecting the cathode portion to a power source;
connecting one or more deposition anodes of the plurality of deposition anodes to the power source;
transmitting electrical energy from the power source through the one or more deposition anodes of the plurality of deposition anodes, through the electrolyte solution, and to the conductive surface of the cathode portion, such that material is deposited onto the conductive surface of the cathode portion forms at least a portion of a component, wherein:
the first build plate comprises a thermal feature configured to transfer heat;

the material deposited onto the conductive surface is thermally coupled with the thermal feature to promote heat transfer by or to the thermal feature; and the material deposited onto the conductive surface forms a heat wicking feature that comprises protrusions, spaced apart from each other and each located at a corresponding one of multiple discrete locations distributed along the heat wicking feature;

positioning a second build plate into the electrolyte solution such that a conductive surface of a cathode portion of the second build plate directly contacts the electrolyte solution;

positioning the deposition anode array into the electrolyte solution such that a gap is established between the conductive surface of the cathode portion of the second build plate and the deposition anode array;

connecting the cathode portion of the second build plate to the power source;

transmitting electrical energy from the power source through the one or more deposition anodes of the plurality of deposition anodes, through the electrolyte solution, and to the conductive surface of the cathode portion of the second build plate, such that material is deposited onto the conductive surface of the cathode portion of the second build plate forms at least a portion of a second component, wherein:

the second build plate comprises a second thermal feature configured to transfer heat;

the material deposited onto the conductive surface of the cathode portion of the second build plate is thermally coupled with the second thermal feature to promote heat transfer by or to the second thermal feature; and the material deposited onto the conductive surface of the cathode portion of the second build plate forms a second heat wicking feature; and coupling together opposing end portions of the first build plate to opposing end portions of the second build plate to define a sealed fluid channel between the first build plate and the second build plate, wherein:

the heat wicking feature and the second heat wicking feature are located within the sealed fluid channel;

the heat wicking feature and the second heat wicking feature are spaced apart from each other except at the discrete locations where the protrusions of the heat wicking feature and the second heat wicking feature contact each other; and the discrete locations are distributed across a width of the sealed fluid channel.

11. The electrochemical additive manufacturing method according to claim 10, wherein, at each one of the one or more discrete locations, the heat wicking feature, including the protrusion, and the second heat wicking feature together span the sealed fluid channel.

12. The electrochemical additive manufacturing method according to claim 10, wherein, the second heat wicking feature comprises recesses, spaced apart from each other across the second heat wicking feature and each receiving a corresponding one of the protrusions of the heat wicking feature.

13. The electrochemical additive manufacturing method according to claim 10, wherein the heat wicking feature comprises three or more protrusions that contact the second heat wicking feature at three or more discrete locations.

14. The electrochemical additive manufacturing method according to claim 10, wherein the heat wicking feature, including the protrusions, is a first lattice and the second heat wicking feature is a second lattice.

15. An electrochemical additive manufacturing method, comprising steps of:

positioning a build plate into an electrolyte solution such that a conductive surface of a cathode portion of the build plate directly contacts the electrolyte solution;

positioning a deposition anode array, comprising a plurality of deposition anodes, into the electrolyte solution such that a gap is established between the conductive surface of the cathode portion and the deposition anode array;

connecting the cathode portion to a power source;

connecting one or more deposition anodes of the plurality of deposition anodes to the power source; and transmitting electrical energy from the power source through the one or more deposition anodes of the plurality of deposition anodes, through the electrolyte solution, and to the conductive surface of the cathode portion, such that material is deposited onto the conductive surface of the cathode portion forms at least a portion of a component, wherein:

the build plate comprises a thermal feature configured to transfer heat;

the material deposited onto the conductive surface is thermally coupled with the thermal feature to promote heat transfer by or to the thermal feature; and the material deposited onto the conductive surface forms a heat wicking feature comprising a plurality of protrusions spaced apart from each other at discrete locations distributed across the heat wicking feature.

16. The electrochemical additive manufacturing method according to claim 15, further comprising coupling together opposing end portions of the build plate to opposing end portions of a second build plate to define a sealed fluid channel between the build plate and the second build plate, wherein the heat wicking feature is located within the sealed fluid channel.

17. The electrochemical additive manufacturing method according to claim 16, wherein:

a second heat wicking feature is attached to the second build plate; and the second heat wicking feature is located within the sealed fluid channel when the opposing end portions of the build plate and the opposing end portions of the second build plate are coupled together.

18. The electrochemical additive manufacturing method according to claim 17, wherein the heat wicking feature and the second heat wicking feature are spaced apart from each other except at one or more discrete locations where the plurality of protrusions of the heat wicking feature contact the second heat wicking feature.

19. The electrochemical additive manufacturing method according to claim 18, wherein:

the second heat wicking feature comprises a plurality of recesses at discrete locations across the second heat wicking feature; and each one of the plurality of protrusions of the heat wicking feature is nestably inserted into a corresponding one of the plurality of recesses of the second heat wicking feature.

20. The electrochemical additive manufacturing method according to claim 19, wherein the heat wicking feature, including the plurality of protrusions, is a first lattice and the second heat wicking feature, including the plurality of recesses, is a second lattice.

\* \* \* \* \*